(12) United States Patent
Wagner

(10) Patent No.: US 6,550,797 B2
(45) Date of Patent: Apr. 22, 2003

(54) ZERO ROLL SUSPENSION SYSTEM

(75) Inventor: J. Todd Wagner, East Haven, CT (US)

(73) Assignee: Zero Roll Suspension, LLC, Wallingford, CT (US)

(*) Notice: Subject to any disclaimer, the term of this patent is extended or adjusted under 35 U.S.C. 154(b) by 0 days.

(21) Appl. No.: 09/811,198

(22) Filed: Mar. 16, 2001

(65) Prior Publication Data

US 2002/0096852 A1 Jul. 25, 2002

Related U.S. Application Data

(60) Provisional application No. 60/254,521, filed on Dec. 11, 2000, provisional application No. 60/253,772, filed on Nov. 29, 2000, and provisional application No. 60/252,766, filed on Nov. 22, 2000.

(51) Int. Cl.[7] ............................................. B60G 3/20
(52) U.S. Cl. ..................... 280/124.136; 280/124.135; 280/124.138; 280/86.751; 280/86.757
(58) Field of Search ................... 280/124.136, 124.135, 280/124.138, 124.143, 86.75, 86.757, 86.751

(56) References Cited

U.S. PATENT DOCUMENTS

| | | | | |
|---|---|---|---|---|
| 2,162,067 A | * | 6/1939 | Dreyer ................ | 280/124.136 |
| 4,589,678 A | * | 5/1986 | Lund ................... | 280/5.511 |
| 5,098,116 A | * | 3/1992 | Edahiro et al. ....... | 280/124.144 |
| 5,498,019 A | * | 3/1996 | Adato ................. | 280/124.136 |
| 5,821,434 A | * | 10/1998 | Halliday ............... | 280/5.52 |
| 6,173,978 B1 | * | 1/2001 | Wagner ............... | 280/124.135 |

* cited by examiner

Primary Examiner—Eric Culbreth
(74) Attorney, Agent, or Firm—McCormick, Paulding & Huber LLP

(57) ABSTRACT

A zero roll suspension system for a vehicle that includes a vehicle frame and a wheel assembly has an axis of rotation. The present system preferably includes first and second crossing members, each of which has a first end and a second end. One of the first and second ends of each of the first and second crossing members is adapted to be mated to a portion of the wheel assembly. The other of the first and second ends of each of the first and second crossing members is adapted to be mated to the vehicle frame. The first and second crossing members are oriented so as to cross one another in superposition along a crossing axis while each crossing a longitudinal centerline of the vehicle.

14 Claims, 18 Drawing Sheets

FRONT SUSPENSION SET
FRONT WHEEL DRIVE

REAR SUSPENSION SET

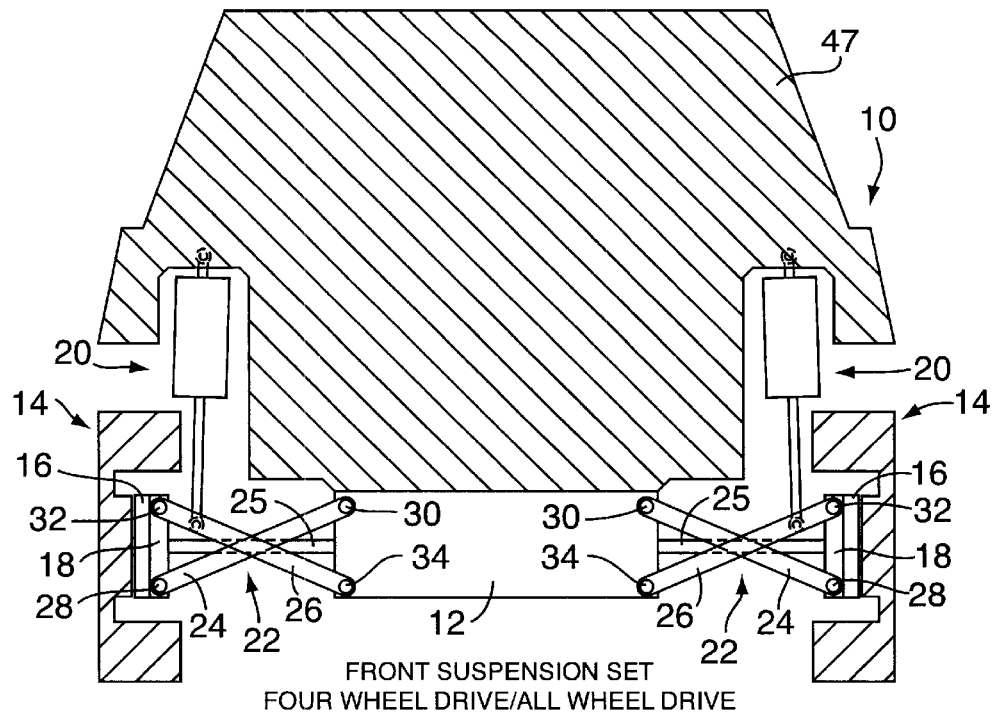
FIG. 8a — FRONT SUSPENSION SET FOUR WHEEL DRIVE/ALL WHEEL DRIVE
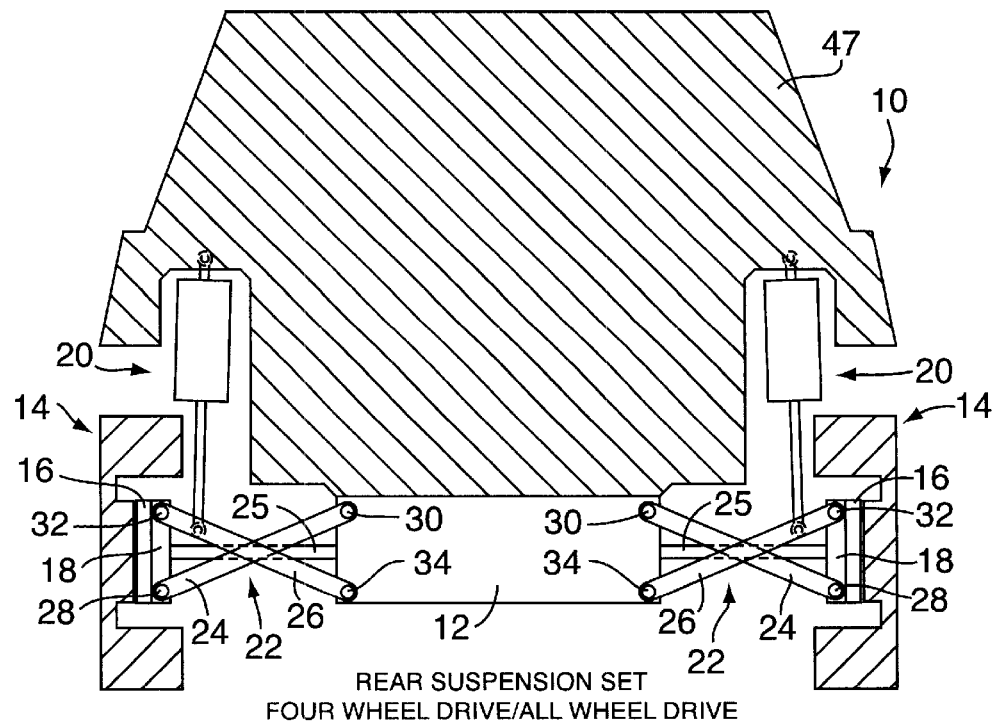
FIG. 8b — REAR SUSPENSION SET FOUR WHEEL DRIVE/ALL WHEEL DRIVE

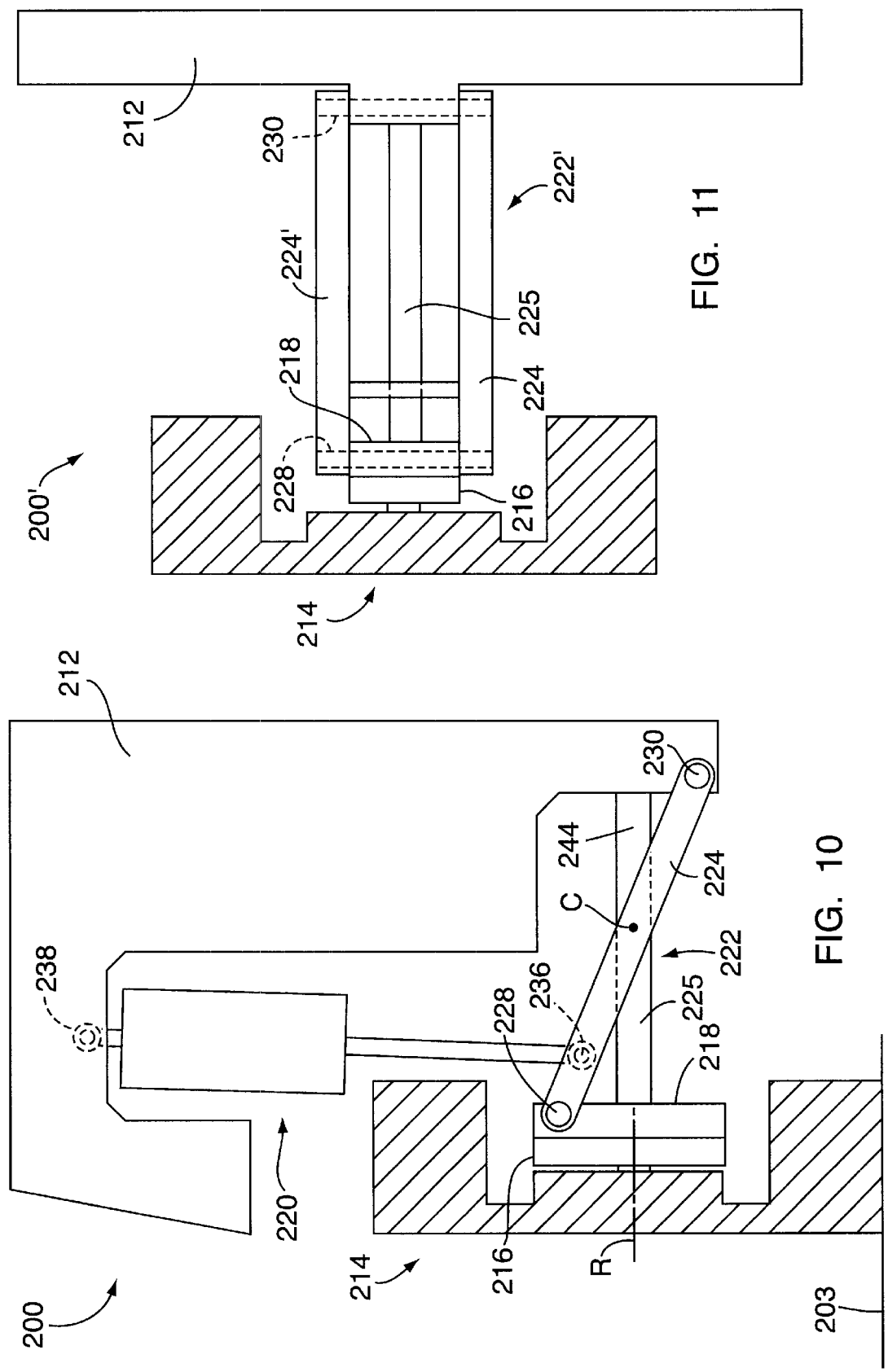

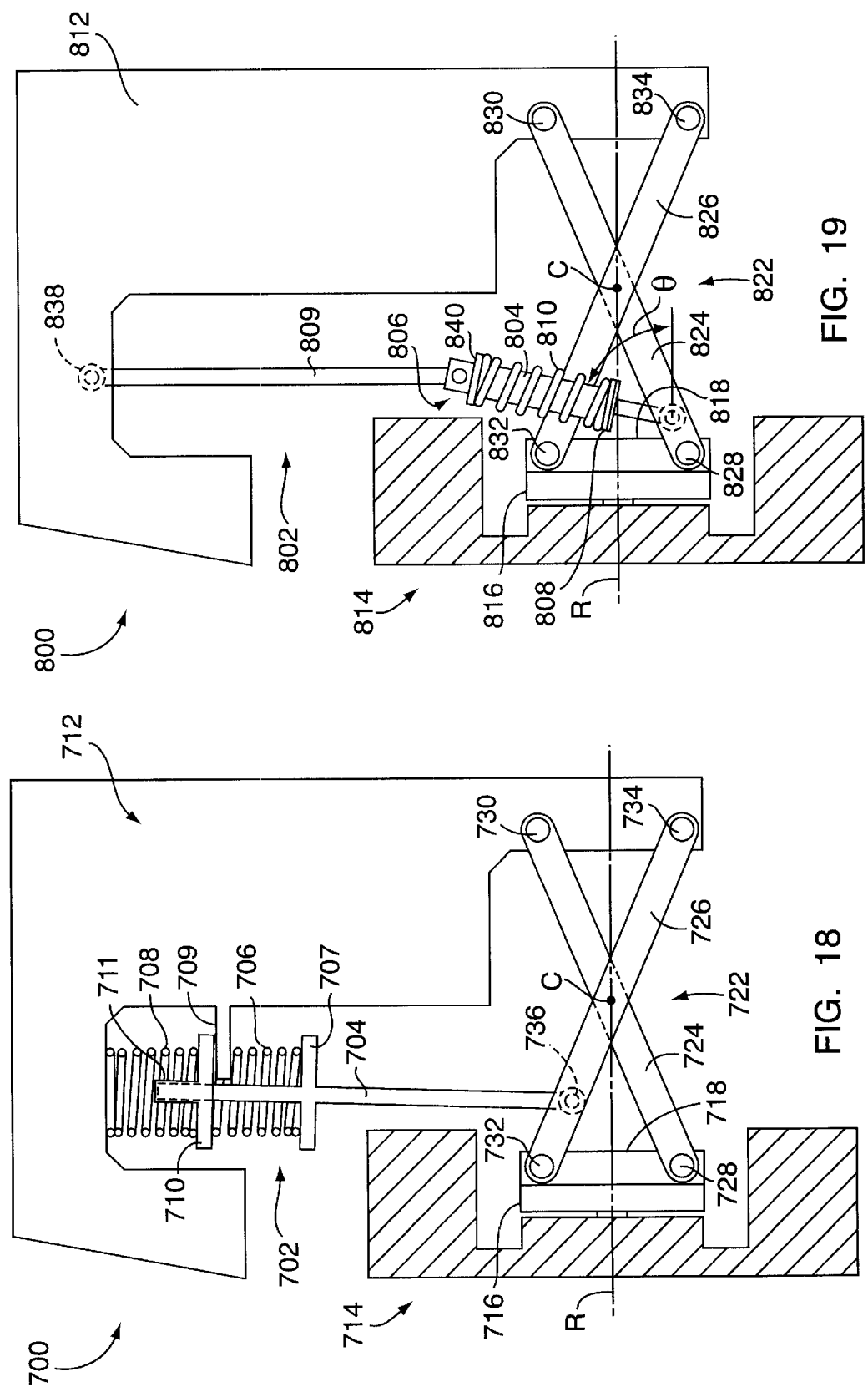

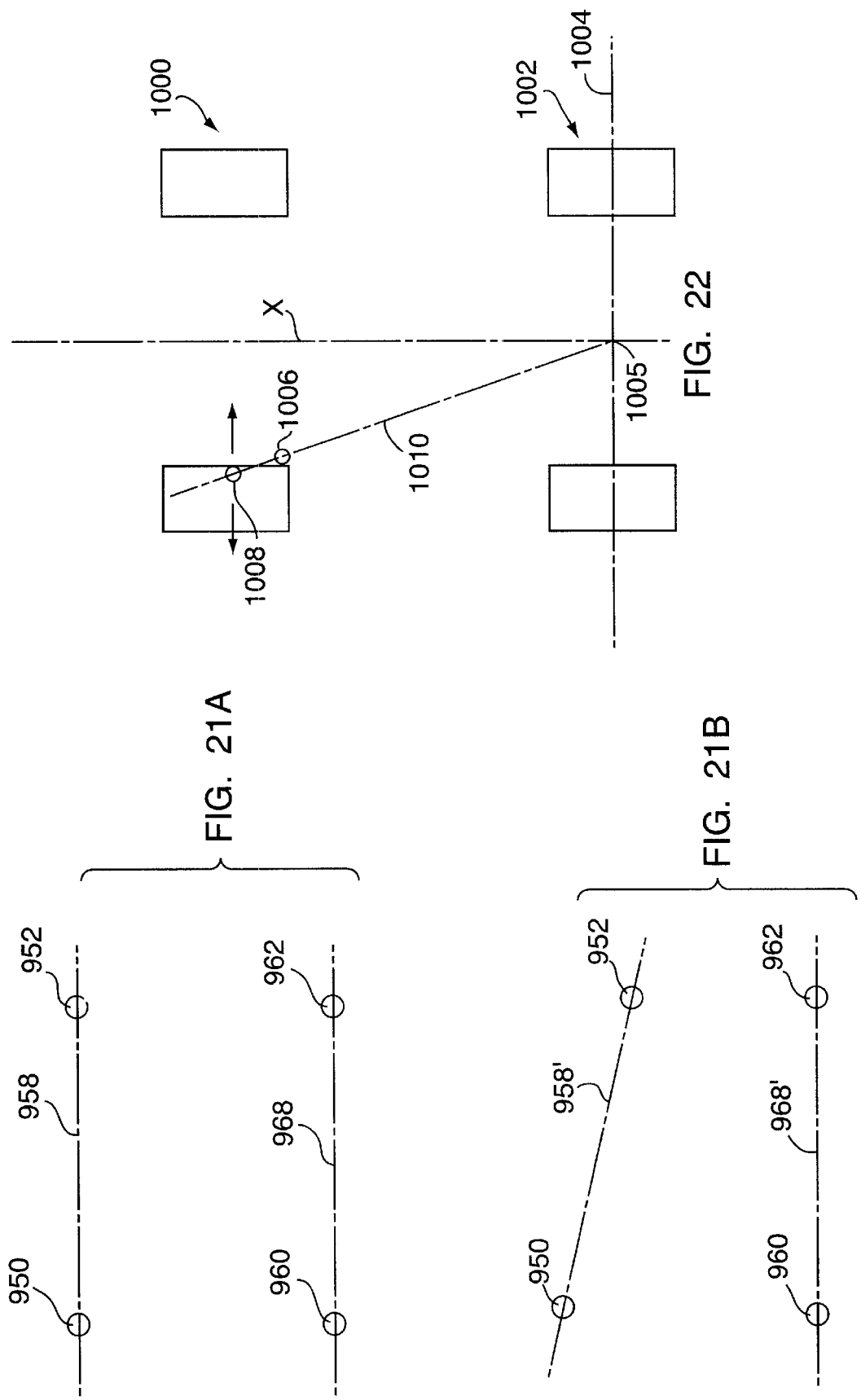

ZERO ROLL SUSPENSION SYSTEM

CROSS REFERENCE TO RELATED APPLICATIONS

This application claims the benefit of pending U.S. Provisional Applications No. 60/252,766, filed Nov. 11, 2000, No. 60/253,772, filed Nov. 29, 2000 and No. 60/254,521, filed Dec. 11, 2000.

FIELD OF THE INVENTION

The present invention relates generally to a suspension system for vehicles, and more particularly to a suspension system for controlling the lateral roll of a vehicle during cornering and additionally for controlling fore-aft movement, or pitch, commonly described as vehicle rise and squat, caused by the inertia of the vehicle during acceleration and deceleration.

BACKGROUND OF THE INVENTION

Vehicle suspension characteristics generally determine ride height, spring rates, caster, camber, toe-in, braking dive, acceleration squat, and cornering roll. Anti-roll suspension systems are those in which forces that tend to cause roll of the vehicle body with respect to the wheels about a longitudinal axis are resisted by forces acting through or on the suspension system. Vehicle suspension systems having anti-roll characteristics are generally either 'active' suspensions using hydraulic actuators to adjust suspension characteristics in response to sensed lateral acceleration, or more commonly, suspensions that incorporate devices such as anti-roll or stabilizer bars that have fixed suspension characteristics.

Typical of an 'active' suspension system is U.S. Pat. No. 4,865,347 for *Actively Controlled Suspension System Anti-Roll Control*, issued to Fukushima et al. on Sep. 12, 1989, which describes a suspension system having an anti-roll control loop in which the gain is adjusted depending on the speed of the vehicle. The '347 suspension system utilizes acceleration sensors to detect lateral acceleration and pressure control valves to adjust hydraulic cylinders which vary the suspension characteristics according to the speed of the vehicle.

U.S. Pat. No. 4,948,164 for *Actively Controlled Suspension System with Compensation of Delay in Phase in Control System*, issued to Hano et al. on Aug. 14, 1990 describes an actively controlled suspension system, which can compensate for phase delay caused in a control system and load condition on the vehicle. The active suspension system described in the '164 patent employs a plurality of acceleration sensors for detecting lateral acceleration. Based on the sensed acceleration, anti-rolling suspension control signals are produced for controlling suspension characteristics of left and right-side suspension systems.

U.S. Pat. No. 5,114,177 for *Anti-Rolling Controlling System for Automotive Active Suspension System With Road Friction Dependent Variable Control Characteristics*, issued to Fukunaga on May 19, 1992, is directed to an active anti-rolling suspension control system having a means for monitoring road friction conditions and a means for distributing rolling moment between front suspension systems and rear suspension systems.

U.S. Pat. No. 3,820,812 for *Vehicle Suspension Systems*, issued to Stubbs, et al. on Jun. 28, 1974, is for an active anti-roll suspension control system for four-wheeled road vehicles that have variable-length hydraulic struts acting in series with the front springs controlled by a control unit sensitive to lateral acceleration. The rear suspension anti-roll system is applied by hydraulic cylinders acting on the rear suspension independently of the rear springs and controlled by the control units for the corresponding front struts.

Active anti-roll suspension systems such as those described above have the disadvantage of being relatively complex and have proved too costly to implement in most vehicles. Anti-roll suspension systems with fixed suspension characteristics, in which the anti-roll damping forces do not vary with speed or direction, are also described in the prior art. U.S. Pat. No. 4,573,702 for *Anti-Pitch Suspension*, issued to Klem on Mar. 4, 1986, for example, is for a vehicle suspension system designed to utilize lateral movement of the body of the vehicle relative to the wheels in order to control the sway or roll of the vehicle body. The '702 suspension system utilizes springs of various types to create an additional means to increase compression or extension of conventional suspension pieces. The principle of the invention may also be used to control dive during braking or squat during acceleration.

U.S. Pat. No. 5,074,582 for *Vehicle Suspension System*, issued to Parsons on Jul. 5, 1990, depicts a roll frame pivotally mounted transverse of the vehicle, the roll frame having an arm at either end and a wishbone pivotally supported on each arm. Each wishbone forms part of a linkage for supporting a wheel of the vehicle.

U.S. Pat. No. 4,143,887 for *Independent Rear Suspension System*, issued to Williams on Dec. 21, 1977, depicts a rear suspension utilizing a torsion bar mounted between oppositely disposed wheel carriers and cooperable with laterally extending control arms for providing roll steer characteristics for the rear wheels.

U.S. Patent Nos. 5,388,855 and 5,193,843 both entitled *Suspension System of a Vehicle* and both issued to Yamamoto on May 24, 1994 and Mar. 16, 1993, respectively, are directed to a double pivot type suspension system to allow a wheel located radially inward in relation to a turning circle to be turned more sharply than a wheel located radially outward in relation to the turning circle.

U.S. Pat. No. 5,415,427 for *Wheel Suspension System*, issued to Sommerer et al. on May 16, 1995, depicts a suspension system comprising a wheel carrier supported on the body side by way of a spring strut. The wheel carrier is guided by two individual links forming an upper pivotal connection and a lower pivotal connection between the wheel and the vehicle body. The pivotal connections are arranged at different angles with respect to the wheel contact plane and, viewed from the top, are arranged to be crossed with respect to one another.

U.S. Pat. No. 4,406,479 for *Vehicle Suspension Incorporating Cross-Over Links*, issued to Chalmers on Sep. 27, 1983, is directed to a suspension system for a vehicle having a pair of torque rods splayed or outwardly angled relative to the longitudinal axis of the vehicle in which the torque rods cross each other as viewed from the top and are flexibly connected to the vehicle chassis at their inner ends.

Although springs and anti-roll bars described in the prior art reduce cornering roll, there is a trade-off between reduction in roll and the smoothness of the ride. Spring and shock rates that increase the smoothness of the ride counteract the effect of the conventional anti-roll devices described in the prior art. Moreover, such anti-roll devices do not compensate for variations in weight distribution of the vehicle, which can also significantly affect rolling characteristics.

OBJECTS AND SUMMARY OF THE INVENTION

It is an object of the present invention to provide an economical anti-roll suspension system for vehicles that reduces cornering roll, acceleration squat and braking dive to nearly zero by using crossed mechanical linkages that cancel rolling moments at each wheel.

It is another object of the present invention to provide an improved anti-roll suspension system that is independent of the weight distribution of the vehicle.

It is yet another object of the present invention to provide an anti-roll suspension system that can be easily modified to allow some frame/body roll out of a corner such that the tops of all wheels are cambered into the corner to improve cornering grip.

It is a further object of the present invention to provide an anti-roll suspension system that can be applied only to the front wheels of a vehicle having a solid axle suspension in order to achieve reduced body roll.

It is a further object of the present invention to provide an anti-roll suspension system that does not require the use of a stabilizer or anti-roll bar.

It is another aspect of the present invention to provide an anti-roll suspension system, which counteracts the lifting of the vehicle body.

According to one embodiment of the present invention, a zero roll suspension system is proposed for a vehicle including a vehicle frame and a wheel assembly having an axis of rotation about which a wheel of said wheel assembly rotates.

The suspension system includes a first crossing member and a second crossing member which are adapted to be fixed to the wheel assembly and the vehicle frame so as to cross one another in superposition.

The present invention is directed towards an anti-roll apparatus for vehicles that uses the load moment on the wheel of the vehicle, which is generated by the cornering force at the point of contact between the tire and the road, to cancel out the rolling moment in the vehicle frame and body. The device described herein may be utilized at each independently suspended wheel assembly of a vehicle.

Conventional suspension systems have upper and lower linkages, which transmit forces from the wheel to the vehicle body, and generally increase the roll of the vehicle during cornering. The present invention takes advantage of the fact that both the wheel moment and the body roll moment are proportional to the cornering force. By orienting the suspension links such that the links cross each other, the wheel load moment opposes the rolling moment of the vehicle. The anti-roll effect of the present invention can be increased or decreased by changing the vertical distances between the linkage attachment points on the vehicle body and the wheel, as will be hereinafter described.

BRIEF DESCRIPTION OF THE DRAWINGS

FIGS. 8a and 8b are partial cross-sectional views of an embodiment of the present invention implemented on a four-wheel drive vehicle.

FIG. 10 is a partial cross-sectional view of a zero roll suspension system implemented in a rear wheel drive vehicle in which the drive shaft acts as one of the crossed links, according to another embodiment of the present invention.

FIG. 11 is a top, partial cross-sectional plan view of a zero roll suspension system according to another embodiment of the present invention in which the drive shaft acts as one of the crossed links.

FIG. 18 illustrates a partial cross-sectional perspective view of a suspension system, according to another embodiment of the present invention.

FIG. 19 illustrates a partial cross-sectional perspective view of a suspension system, according to another embodiment of the present invention.

FIG. 21A shows a parallel configuration of the linking mechanism of the present invention, including A-frame members acting as the crossing arms.

FIG. 21B shows a non-parallel configuration of the linking mechanism of the present invention, including A-frame members acting as the crossing arms.

FIG. 22 illustrates a top perspective view of an unillustrated vehicle where Ackerman is utilized to control body lift of the vehicle, according to another embodiment of the present invention.

DETAILED DESCRIPTION OF THE PREFERRED EMBODIMENTS

Figure 1:
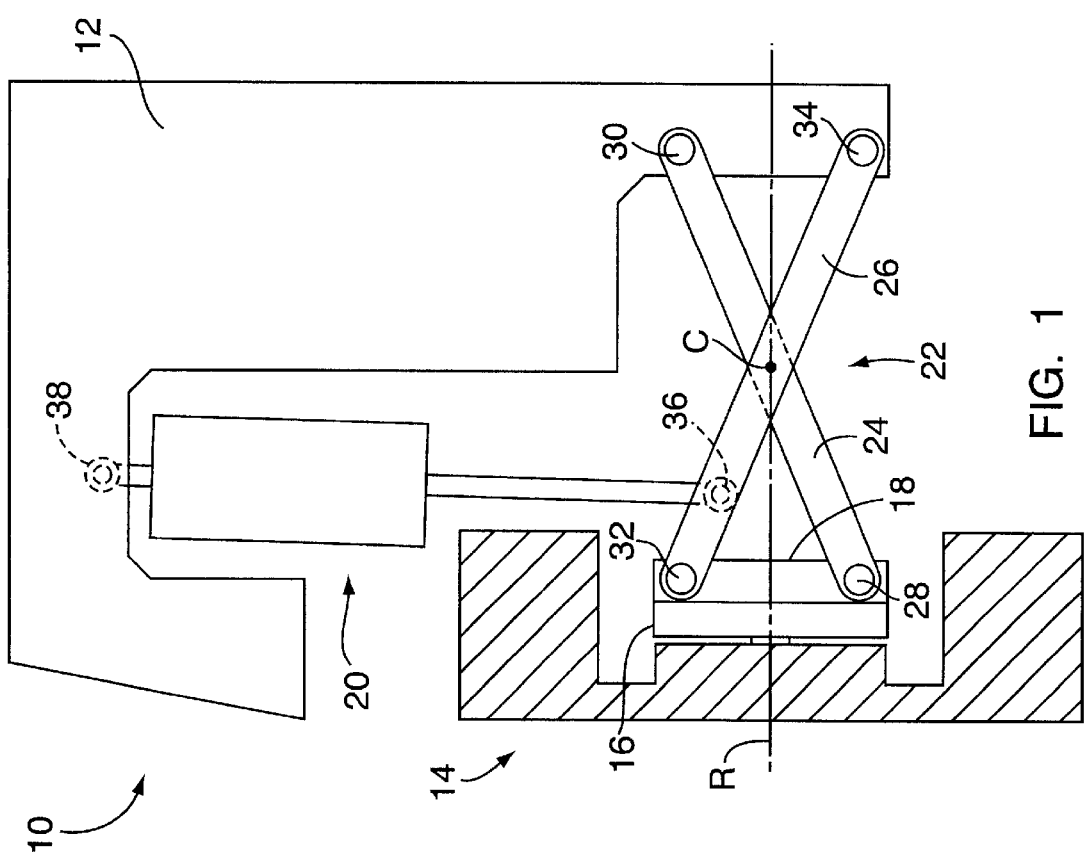
FIG. 1 is a partial cross-sectional view of a zero roll suspension system having perpendicular rotational and crossing axes, according to one embodiment of the present invention.

Referring to FIG. 1, a suspension system for controlling the lateral roll of a vehicle during cornering, according to one embodiment of the present invention, is generally designated by the reference numeral 10. The suspension system 10 is adapted to be received by the body of a vehicle, such as an automobile frame 12, having a wheel assembly 14, a spindle 16, a kingpin 18, and a spring and shock absorber assembly 20. The wheel assembly 14 has an axis of rotation R about which a wheel of the wheel assembly 14 rotates. The vehicle frame 12 may be of any automobile make or model, such as but not limited to a pick-up truck, an utility truck, a three-wheeled vehicle or a four-wheeled or more wheeled vehicle that tends to rotate or roll during cornering.

The spring and shock absorber assembly 20 provides vertical support for the wheel assembly 14 and the vehicle frame 12 while, as is commonly known, the wheel assembly 14, the spindle 16 and the kingpin 18 are each integrally connected in a conventional manner so as to provide for structural stability and control of the vehicle. The present embodiment of FIG. 1 includes a crossed linking mechanism 22, which acts to connect the wheel assembly 14 to the vehicle body 12. While the suspension system 10 will function with most vehicles, it should be readily apparent that the actual shape and size of various components will depend upon the size and weight of the associated vehicle. It should be readily apparent that while one linking mechanism 22 has been described, more than one linking mechanism may be alternatively substituted without departing from the broader aspects of the present invention, as will be described later.

Referring still to FIG. 1, the linking mechanism 22 of the present invention reverses the moment, preferably at the wheel, to oppose the rolling moment of the vehicle body 12 during cornering. The linking mechanism 22 includes at least a first elongated member 24 and a second elongated member 26 which are oriented so as to cross each other in substantially parallel planes along a crossing axis C. It will be readily apparent that the crossing axis C is not an axis which defines predetermined, fixed points along either the first elongated member 24 or the second elongated member 26. The crossing axis C, as seen in FIG. 1, may initially lie above, below or on the rotational axis R, and will shift from this initial position during operation of the present invention. Moreover, although FIG. 1 illustrates the first elongated member 24 and the second elongated member 26 crossing one another in substantially parallel planes as viewed horizontally, the present invention is not limited in this regard as the first elongated member 24 and the second elongated member 26 may have any planar relationship between one another provided that when viewed horizontally, the first elongated member 24 and the second elongated member 26 cross in superposition.

As shown in FIG. 1, each elongated member, 24 and 26 respectively, are additionally oriented so as to cross the rotational axis R of the wheel assembly 14. The present invention, however, is not limited in this regard as the elongated members 24 and 26 may be oriented between the wheel assembly 14 and the vehicle frame 12 SO that they cross one another at a location either above or below the rotational axis R as seen in FIG. 1. Moreover, in the embodiment of FIG. 1, the crossing axis C of the elongated members 24 and 26 is approximately perpendicular to the rotational axis R. It will be readily apparent that the rotational axis R and the crossing axis C are not required to be at any predetermined angle to one another in order for the beneficial aspects of the present invention to be realized. That is, the rotational axis R and the crossing axis C need not necessarily be approximately perpendicular, but rather they may be at any angle to one another, such as but not limited to approximately 0°, 45° or 90°, given a specific configuration of the connection points on the wheel assembly 14 and vehicle frame 12.

The first and second elongated members, 24 and 26 respectively, may be formed from any substantially rigid material including but not limited to metal, a metal-alloy, a composite material or the like. Moreover, each of the first and second elongated members, 24 and 26 respectively, need not be a single unitary element, but rather may be formed from a plurality of mated elements. Preferably, the spring and shock absorber assembly 20 is attached to either the first elongated member 24 or the second elongated member 26 via rotatable pin joint 36, while also being anchored to the vehicle body 12 via rotatable pin joint 38, as shown in FIG. 1. As is further illustrated in FIG. 1, the linking mechanism 22 is fixed to the kingpin 18 at connection points 32 and 28 in any conventional manner so as to enable the linking mechanism 22 to be freely rotatable about connection points 32 and 28 during operation of the suspension system 10. While connection between the shock absorber 20 and either of the elongated members 24 and 26, respectively, has been described and shown in FIG. 1, the present invention is not limited in this regard as the shock absorber 20 may alternatively be connected to either the spindle 16 or the kingpin 18 without departing from the broader aspects of the present invention.

The connection points on the vehicle body 30 and 34, respectively, may be located as shown at in FIG. 1 or at other points of the vehicle frame 12 however, in order to provide for a zero roll suspension system, it is preferable that the connection points 30 and 34 be fixed to the vehicle frame 12 at points on the vehicle frame 12 which are approximately horizontally co-planar to the connection points 32 and 28, respectively. In addition, it is preferable that the connection points 32 and 28 are to be rotatably fixed to the spindle 16 or the kingpin 18 so as to be approximately vertically co-planar with one another, while the connection points 30 and 34 are to be rotatably fixed to the vehicle frame 12 so as to be approximately vertically co-planar with one another as well. Moreover, each of the connection points, 30, 34, 32 and 28 respectively, may be fixed to the vehicle frame 12, and the spindle 16 or the kingpin 18, in any conventional manner, such as but not limited to a pin joint or a ball joint, provided that the linking mechanism 22 is freely rotatable about the connection points 30, 34, 32 and 28 during operation of the suspension system 10. By changing the vertical distances between the connection points 32 and 28, as well as between the connection points 30 and 34, the roll reducing effect may be correspondingly increased or decreased, as will be discussed in greater detail in relation to FIG. 4.

The first elongated member 24 must be long enough to reach between a first connection point 28 which, as discussed previously, may be fixed to the kingpin 18 or the spindle 16, and a second connection point 30 on the vehicle body or frame 12 in a substantially passive manner, that is, such that the first elongated member 24 does not cause any active stressing on the vehicle body 12, the spindle 16, the kingpin 18 or the second elongated member 26. Similarly, the second elongated member 26 must be long enough to reach between a first connection point 32, which may be on the kingpin 18 or the spindle 16, and a second connection point 34, which may be on the vehicle body 12, in a largely passive manner, that is, such that the second elongated member 26 does not cause any active stressing on the vehicle body 12, the spindle 16, the kingpin 18 or the first elongated member 24. While the kingpin 18 or the spindle 16 has been described as the preferred anchoring location for the linking mechanism 22, the present invention is not limited in this regard as other, alternative anchoring locations may be substituted so long as the linking mechanism 22 is fixedly attached, on one side thereof, to a portion of the wheel assembly 14 which remains substantially stationary with respect to a turning motion of the wheel itself.

As utilized above with reference to the embodiment of FIG. 1, and hereinafter in conjunction with alternative embodiments of the linking mechanism according to the present invention, the terms 'cross', 'crosses', 'crossed' or 'crossing' represents the relative arrangement of the connection points 28, 30, 32 and 34, or their equivalents in FIGS. 2–17, as viewed horizontally. That is, if the connection point 28 of the elongated member 24 is located vertically below the connection point 32 of the elongated member 26, then the connection point 30 of the elongated member 24 must be oriented vertically above the connection point 34 of the elongated member 26.

In operation, the suspension system 10 as illustrated in FIG. 1 acts to reverse the rolling load moment at the wheel of the vehicle and transfers this reversed rolling load moment to the vehicle frame 12. The rolling load moment is typically generated by the force at the portion of the wheel contacting a travel surface during operation of the vehicle, such as but not limited to a cornering, acceleration or braking of the vehicle, or the like.

Figure 2:
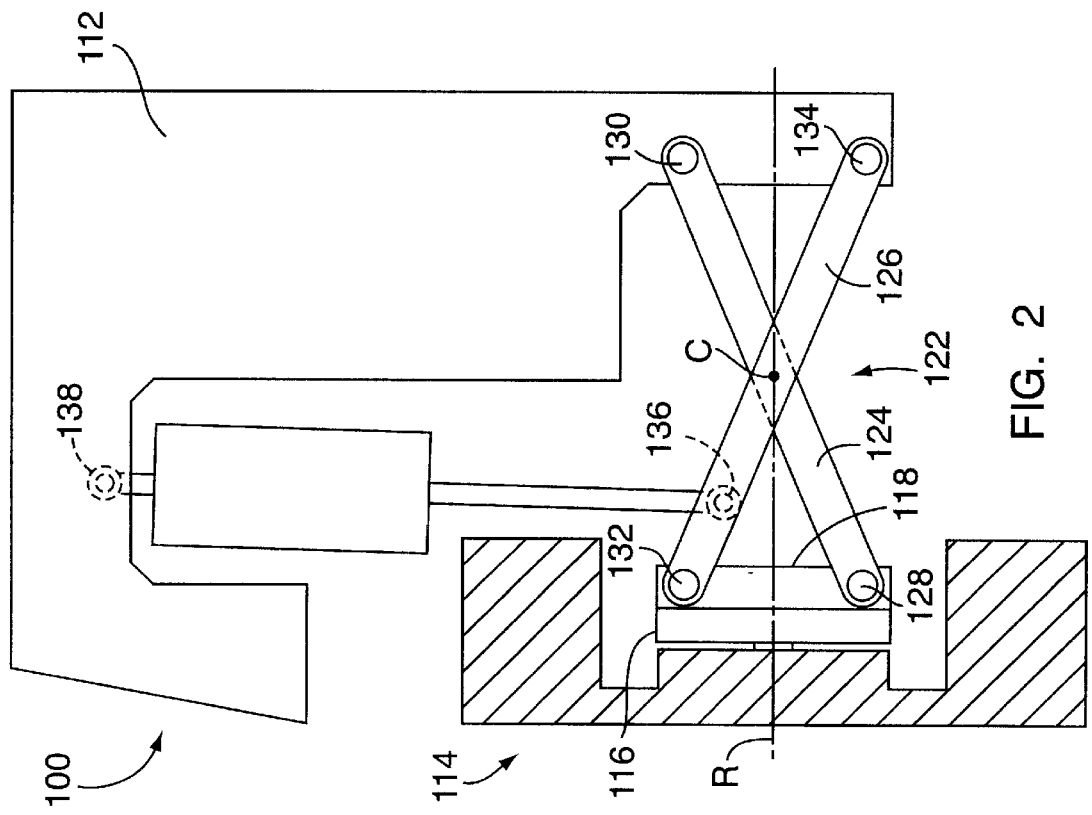
FIG. 2 is a partial cross-sectional view of a zero roll suspension system having a pass through opening in one of the crossed links, according to another embodiment of the present invention.
Figure 2A:
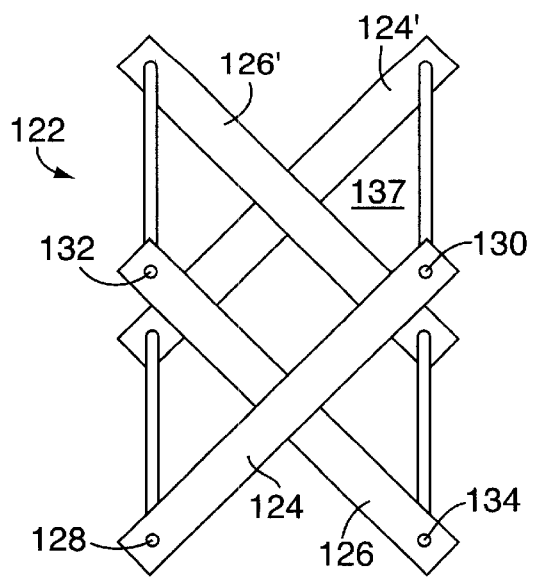
FIG. 2a partial perspective view of a linking mechanism, according to the zero roll suspension system of FIG. 2.

FIG. 2 illustrates another embodiment of the zero roll suspension system of the present invention, generally designated by numeral 100. While FIG. 1 depicts first and second single elongated members, 24 and 26 respectively, crossing in approximately parallel vertical planes, FIG. 2 illustrates the suspension system 100 wherein the linking mechanism 122 includes two, nested pairs of elongated members, 124/124' and 126/126', respectively. The partial perspective view of FIG. 2a more clearly illustrates the nested pairs of elongated members 124/124' and 126/126' which comprise the linking mechanism 122 of the suspension system 100.

The two pairs of elongated members, 124/124' and 126/126' respectively, physically intersect one another by way of a pass-through opening 137 defined between the outermost pair of elongated members 124/124'. It should be readily apparent that the pass-through 137 must be fashioned so as to be somewhat larger in width than the width of the elongated member pair, which is situated within the pass-through 137. This arrangement and size of the pass-through 137 allows for the compensating movement of the pair of elongated members, 126/126' respectively, relative to the outermost pair of elongated members 124/124'. In the embodiment shown in FIG. 2, the crossing axis C of the two pairs of elongated members 124/124' and 126/126' is approximately perpendicular to the rotational axis R; however, as mentioned previously, this angular relationship is not critical to the operation of the present invention and may be any angle, such as but not limited to approximately 0°, 45° or 90°. It will be readily apparent that the two pairs of elongated members, 124/124' and 126/126' respectively, are fashioned so as to minimize any frictional contact between one another, wherein no contact at all is the preferred arrangement.

Figure 3:
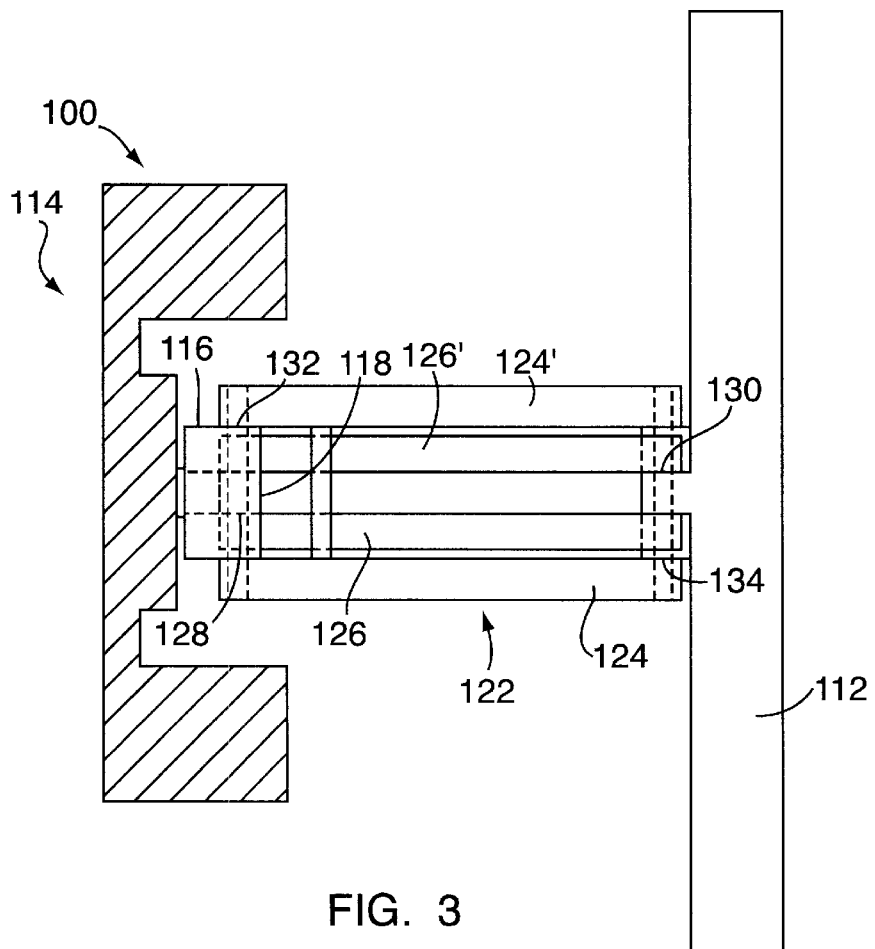
FIG. 3 is a top, partial cross-sectional plan view of a zero roll suspension system according to the zero roll suspension system of FIG. 2.

FIG. 3 illustrates a top, partial cross-sectional plan view of the suspension system 100. As discussed above, the suspension system 100 is such that the linking mechanism 122 includes two nested pairs of elongated members, 124/124' and 126/126', respectively. All four elongated members, 124,124', 126 and 126', are shown as being fixed to the wheel assembly 114 and the vehicle body 112 in a manner similar to the discussion of the suspension system 10 of FIG. 1. The first elongated members, 124 and 124' respectively, are depicted as an outside link between the wheel assembly 114 and the vehicle frame 112, while the second pair of elongated members, 126 and 126' respectively, are shown as an inside link between the wheel assembly 114 and the vehicle frame 112 crossing the first pair of elongated members, 124 and 124', in parallel vertical planes. This particular arrangement and number of stabilizing elongated members 124, 124', 126 and 126', provides for compensation of the rolling load moment of a cornering vehicle, but with even greater stability and compensation capabilities than the suspension system 10 of FIG. 1.

Figure 4:
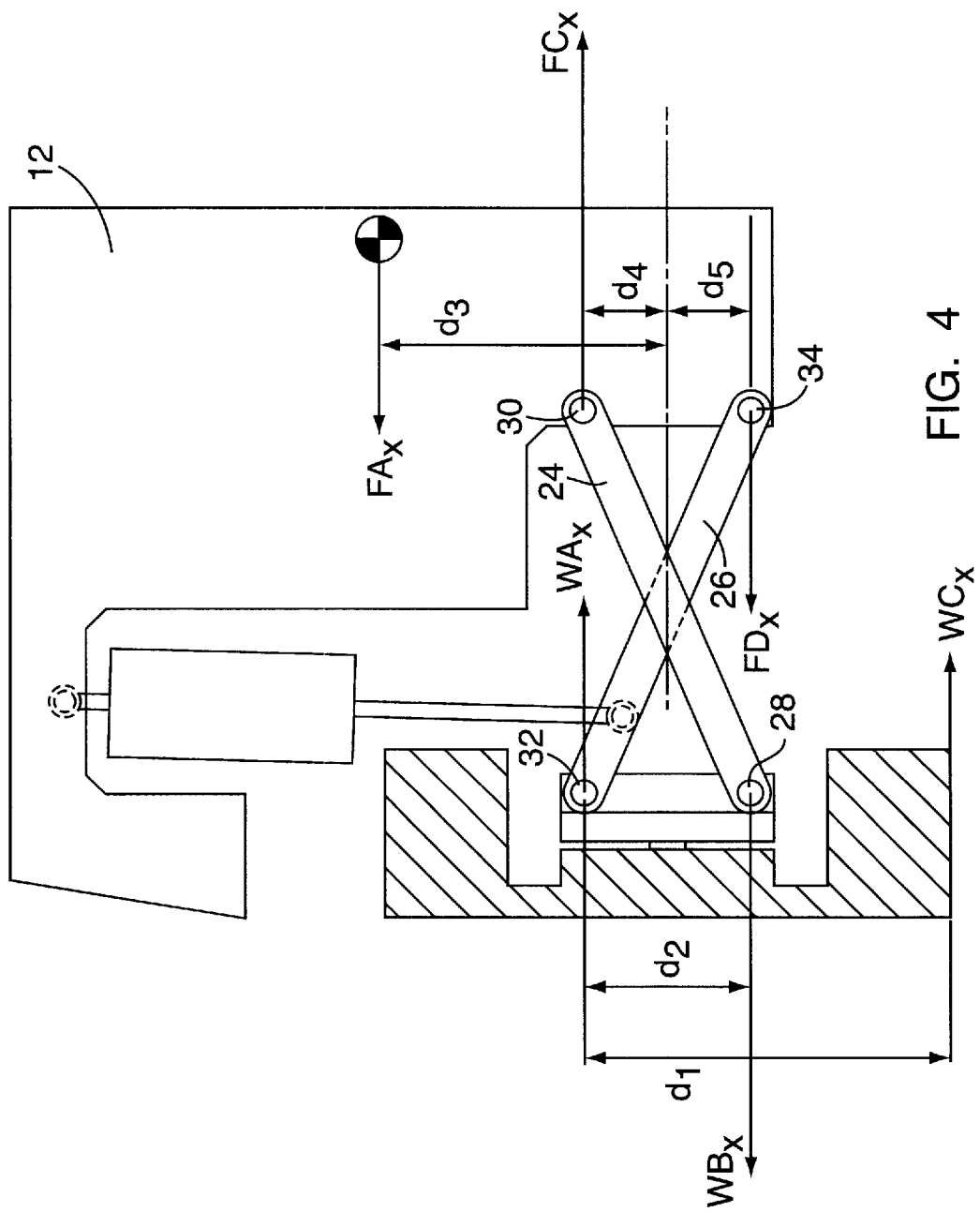
FIG. 4 is a partial cross-sectional view of the forces, which interact in the zero roll suspension system of FIG. 1.
Figure 5:
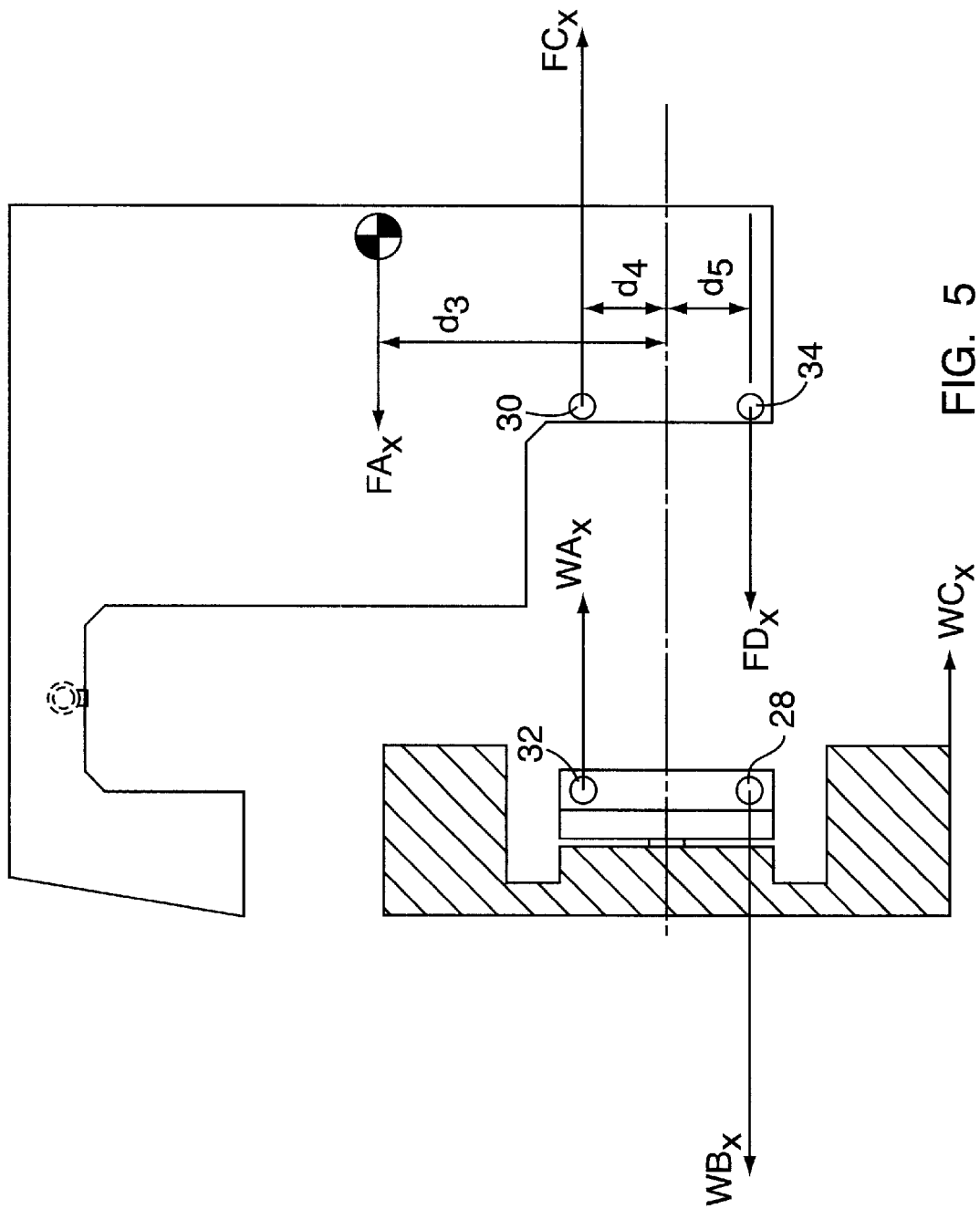
FIG. 5 illustrates a free body diagram of the forces, which interact in the zero roll suspension system of FIG. 1.

The orientation and interaction of forces with respect to the embodiment illustrated in FIG. 1, and similar to the orientation and interaction of forces as illustrated in further embodiments of the present invention, are shown schematically in FIGS. 4 and 5. Referring to FIG. 4, the forces on a vehicle traveling forward (into the paper) and turning right are depicted. The lateral or radial acceleration on the frame of the vehicle 12 gives rise to force $FA_X$ which causes the vehicle to rotate or roll during cornering. Friction between the wheel assembly 14 and the road creates a cornering force shown as force vector $WC_X$, the magnitude of which is determined by the weight and speed of the vehicle. For a four wheeled vehicle with ¼ of the weight on each tire:

$$WC_X = \frac{\text{mass vehicle} \times \text{lateral acceleration}}{4}$$

Lateral forces that the elongated members, 24 and 26 respectively, apply to the connection points 32, 28, 30 and 34 are shown as force vectors $WA_X$, $WB_X$, $FC_X$ and $FD_X$ respectively, where:

$$WB_X = -FC_X \text{ and}$$

$$WA_X = -FD_X$$

Given distances $d_1$ and $d_2$, $WB_X$ can be calculated by summing the moments of forces $WC_X$ and $WB_X$ about connection point 32:

$$\Sigma M = 0 = (d_1)WC_X + (d_2)WB_X$$

Using the values thus determined for $WC_X$ and $WB_X$, $WA_X$ can be calculated by summing the force vectors in the x-direction:

$$\Sigma F_X = 0 = WC_X - WB_X + WA_X$$

The roll canceling ability of the present invention can be decreased by either increasing the distance $d_2$, or by decreasing the distance ($d_4+d_5$). Conversely, the roll canceling ability of the present invention can be increased either by decreasing the distance $d_2$, or increasing the distance ($d_4+d_5$). Accordingly, it is the vertical distances between the connection points, which primarily affect the roll canceling ability of the present invention, while any changes in the horizontal distances between the connection points will primarily affect the cambering of the wheel during operation of the vehicle.

Referring to the free body diagram depicted in FIG. 5 and the formula below, the body rolling moment $M_R$ is calculated about the projected intersection of the elongated members 24, and 26 (unillustrated in FIG. 5) which is midway between connection points 30 and 34.

$$\Sigma M_R = (d_3)FA_X - (d_4)FC_X - (d_5)FD_X$$

By selectively choosing the distance between connection points 30 and 34, the body roll moment can be made to approach zero.

In the embodiments of the suspension systems 10 and 100, as depicted in FIGS. 1–3, the elongated members cross each other in parallel vertical planes and connect the wheel assembly 14 to the vehicle frame 12. In the suspension system 100 as depicted in FIGS. 2–3, each of the two linking mechanisms 122 has pairs of inside and outside elongated members, 124/124' and 126/126' respectively, rotatably fixed to the wheel assembly 114 and to the vehicle frame 112. As described previously, the outside links 124/124' are attached to either the kingpin 118 or spindle 116 at points 128 and to the vehicle body 112 at points 130. The inside links 126/126' are attached to either the kingpin 118 or the spindle 116 at points 132, vertically above or below points 128, and to the vehicle body 112 at points 134, vertically above or below points 130, such that the outside and inside links, 124/124' and 126/126' respectively, are arranged in a crossed pattern.

Figure 6A:
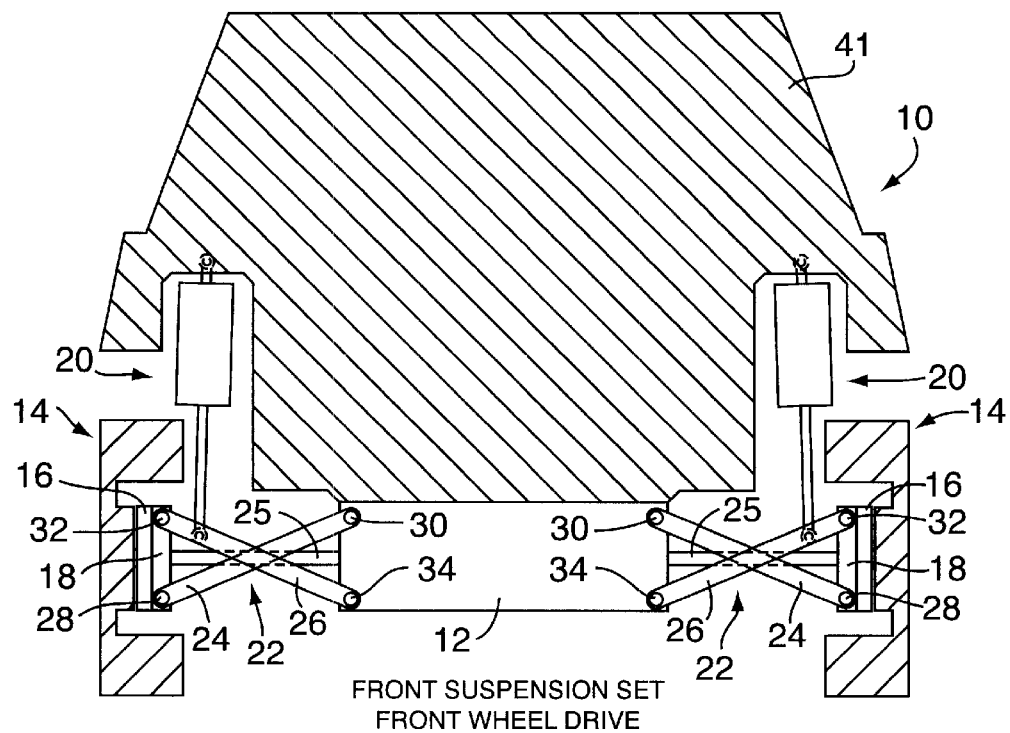
FIGS. 6a and 6b are partial cross-sectional views of an embodiment of the present invention implemented on a front wheel drive vehicle.
Figure 6B:
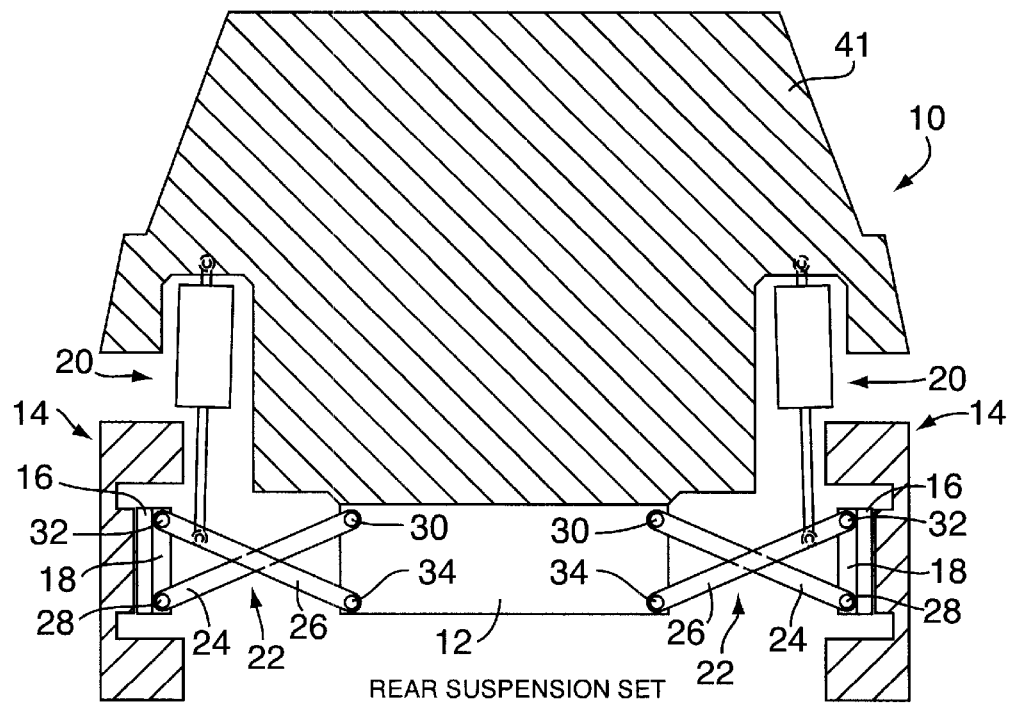

FIGS. 6a and 6b illustrate a partial cross-sectional view of the suspension system 10 of FIG. 1 being incorporated into a front wheel drive vehicle 41. FIG. 6a illustrates the front end of the front wheel drive vehicle 41, including a drive shaft 25 in relation to the linking mechanisms 22 affixed between each wheel assembly 14 and the vehicle frame 12. It should be readily apparent that the drive shaft 25 does not interfere with the application of the linking mechanisms 22 during the operation of the suspension system 10 as described previously in conjunction with FIG. 1.

FIG. 6b illustrates the back end of the front wheel drive vehicle 41, including the linking mechanisms 22 affixed between each wheel assembly 14 and the vehicle frame 12. While the linking mechanism 22, including single elongated members 24 and 26, is shown as being affixed between each wheel assembly 14 and the vehicle frame 12 in the cross-sectional view of FIGS. 6a and 6b, the present invention is not limited in this regard as pairs of linking mechanisms may be affixed at each wheel assembly 14 location, similar to the arrangement illustrated in FIGS. 2–3, without departing from the broader aspects of the present invention.

Figure 7A:
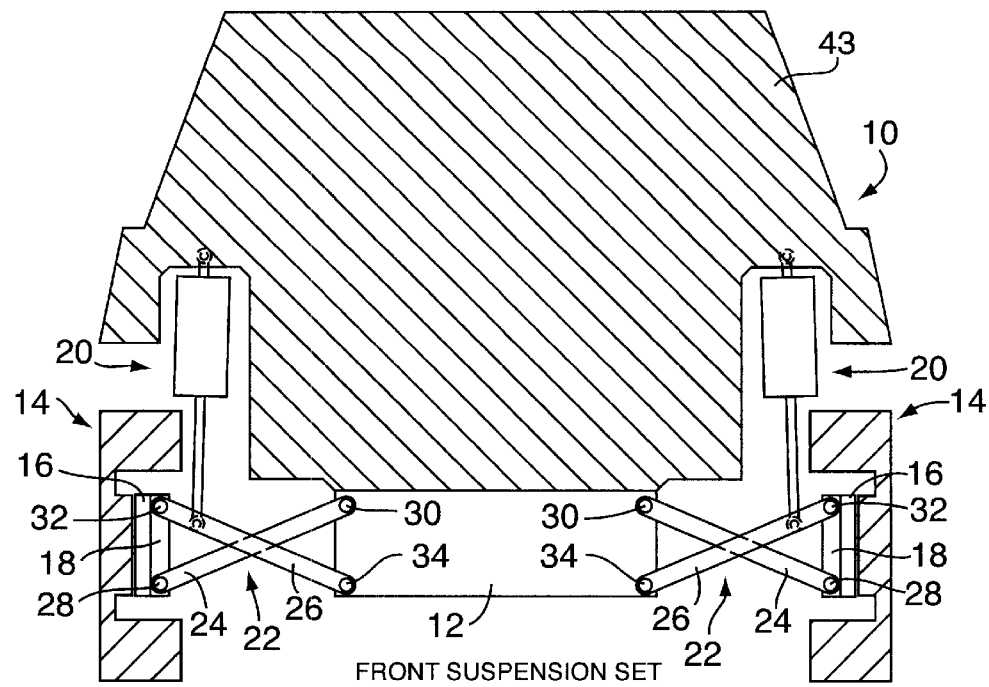
FIGS. 7a and 7b are partial cross-sectional views of an embodiment of the present invention implemented on a rear wheel drive vehicle.
Figure 7B:
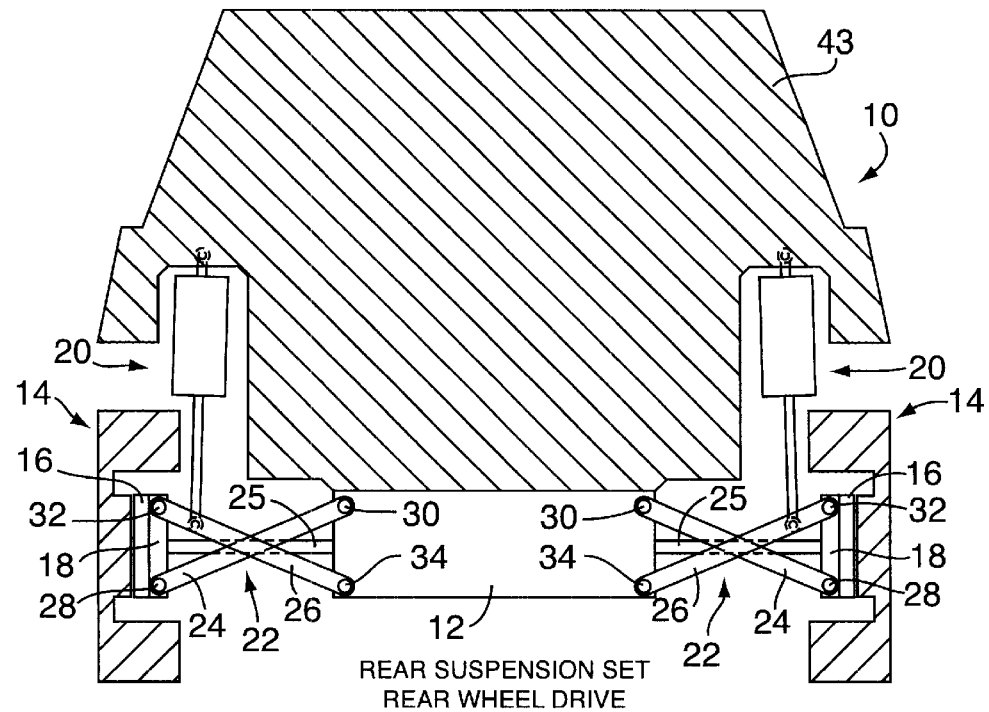
Figure 9A:
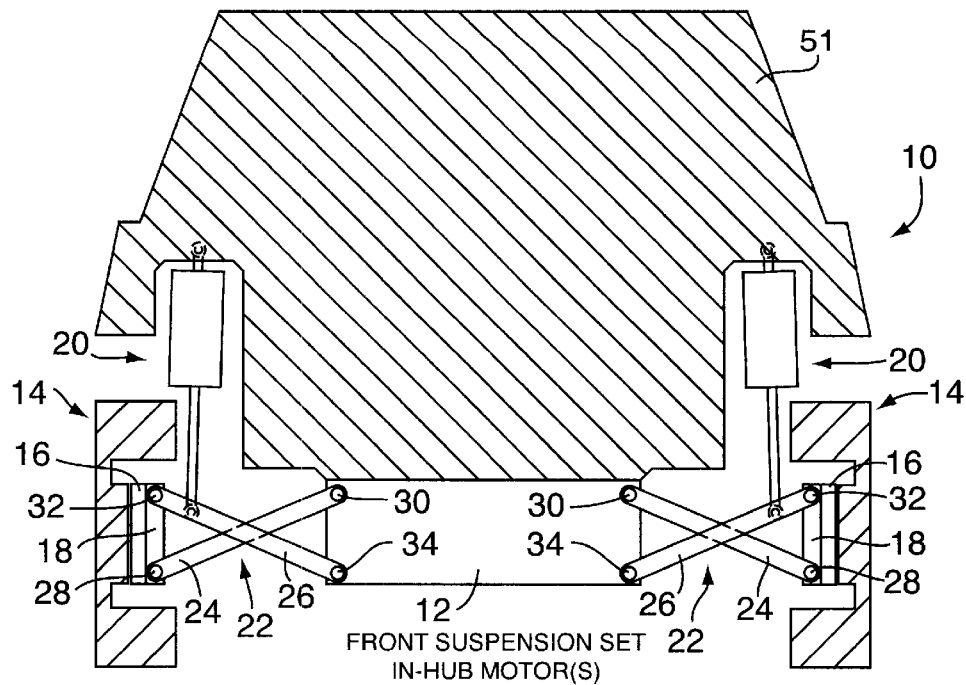
FIGS. 9a and 9b are partial cross-sectional views of an embodiment of the present invention implemented in a vehicle having in hub motors instead of a drive shaft.
Figure 9B:
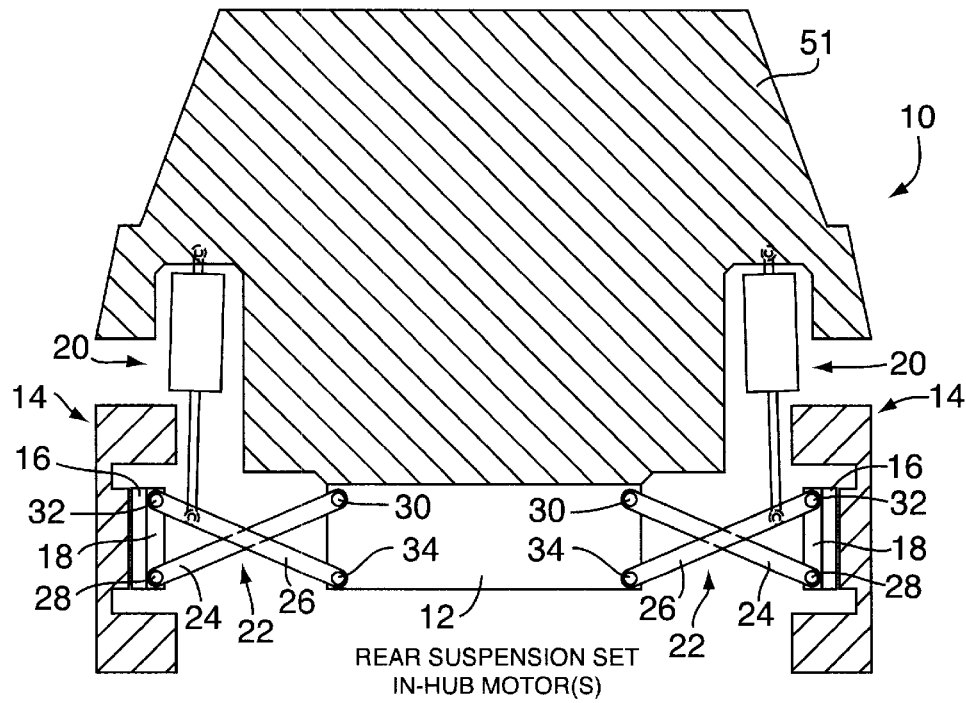

In a similar fashion to the application as shown in FIGS. 6a and 6b, the linking mechanism 22 may be implemented at each wheel assembly 14 on a rear wheel drive vehicle 43, as depicted schematically in FIGS. 7a and 7b. The linking mechanism 22 may also be implemented at each wheel assembly 14 on a four-wheel drive vehicle 47 as shown in FIGS. 8a and 8b, or on a vehicle 51 having in hub motors as shown in FIGS. 9a and 9b. While the linking mechanism 22, including single elongated members 24 and 26, is shown as being affixed between each wheel assembly 14 and the vehicle frame 12 in the cross-sectional views of FIGS. 7a, 7b, 8a, 8b, 9a and 9b, the present invention is not limited in this regard as pairs of linking mechanisms may be affixed at each wheel assembly 14 location, similar to the arrangement illustrated in FIGS. 2–3, without departing from the broader aspects of the present invention.

An additional aspect of the present invention is the application of a zero roll suspension system to only some of the wheel assembly locations of a given vehicle, such as to the front or rear wheels only, while the other wheel assembly locations are equipped with alternative suspension systems, such as struts. When applied in this manner, although roll cancellation may not be balanced, substantial compensation of the vehicle roll encountered during cornering, acceleration and braking may still be obtained.

FIG. 10 illustrates a partial cross-sectional view of yet another embodiment of the suspension system of the present invention, generally designated by reference numeral 200. The suspension system 200 utilizes a drive shaft 225 to act as either one the two elongated members in linking mechanism 222. The drive shaft 225 passes through the center of the spindle 216 and is attached thereto in a conventional manner. The drive shaft 225 is also connected to a fixed portion of a largely unillustrated drive train 244 in a conventional manner. The draft shaft 225 provides structural support between the wheel assembly 214 and the vehicle body 212 and is substantially co-axial with the rotational axis R of the wheel assembly 214. A shock absorber 220 provides vertical support for the wheel assembly 214 and the vehicle frame 212. Preferably, the shock absorber 220 is fixedly attached to a single elongated member 224 via rotatable pin joint 236. It will be readily appreciated that the shock absorber 220 may be of any type, such as but not limited to a spring shock absorber, a gas shock absorber or a hydraulic shock absorber, and further, that the shock absorber 220 may be fixed by the rotatable pin joint 236 to any point along the single elongated member 224, or to any conventional location on the wheel assembly 214, including the spindle 216 and the kingpin 218, in dependence upon the particular suspension design of a specific vehicle, without departing from the broader aspects of the present invention.

Referring still to FIG. 10, the single elongated member 224 is rotatably fixed to the kingpin 218 at a connection point 228 and to the vehicle body 212 at a connection point 230. The vertical orientation of these connection points, 228 and 230 respectively, are functionally interchangeable in that either may be located higher than the other with respect to the plane of the driving surface 203, provided that the connection points, 228 and 230 respectively, are positioned such that the single elongated member 224 and the drive shaft 225 are inclined with respect to one another so as to cross in substantially parallel vertical planes along a crossing axis C.

FIG. 11 illustrates a top, partial cross-sectional view yet another embodiment of a suspension system according to the present invention, generally designated by the reference numeral 200'. The suspension system 200' is similar to the suspension system 200, illustrated in FIG. 10, in its utilization of the drive shaft 225 as a support member. The suspension system 200', however, utilizes a pair of two similarly inclined elongated members, 224 and 224' respectively, situated on either planar side of the drive shaft 225, as shown in FIG. 11, where the drive shaft 225 is shown as the inside link of the linking mechanism 222'. The present embodiment, therefore, contemplates including the pair of elongated members, 224 and 224' respectively, in a manner similar to the utilization of the two pairs of elongated members as shown and described in conjunction with FIGS. 2–3.

In accordance with the previous embodiments of the present invention, the elongated members, 224 and 224' respectively, are rotatably fixed between the vehicle frame 212 and either the spindle 216 or the kingpin 218 on the wheel assembly 214.

Figure 12A:
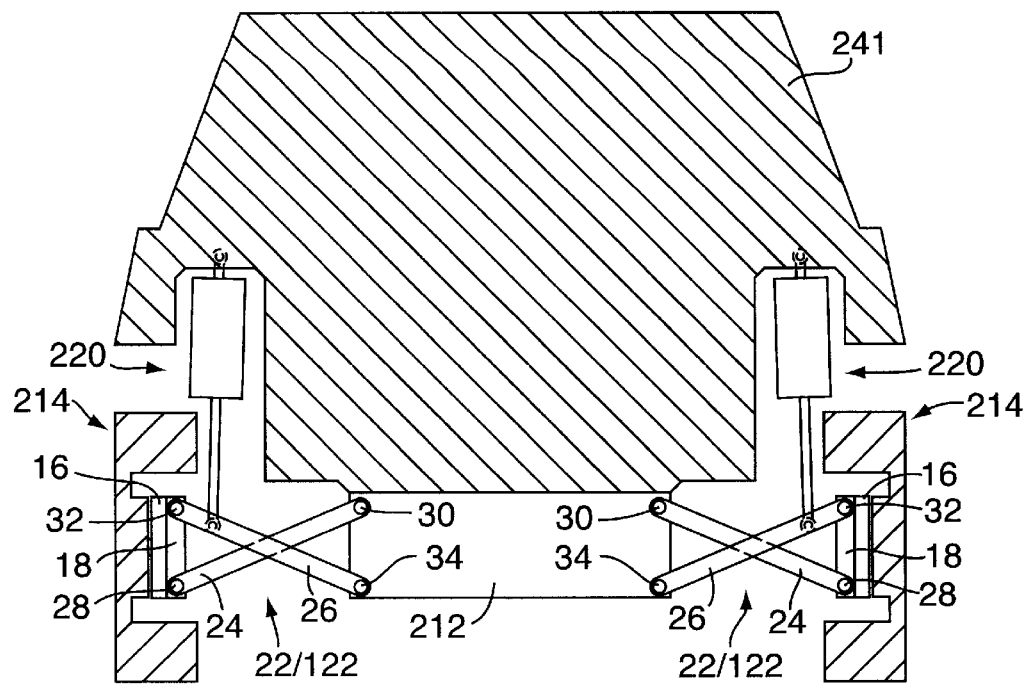
FIGS. 12a and 12b are schematic views of an embodiment of the present invention implemented on a rear wheel drive vehicle in which the drive shaft acts as one of the crossed links.
Figure 12B:
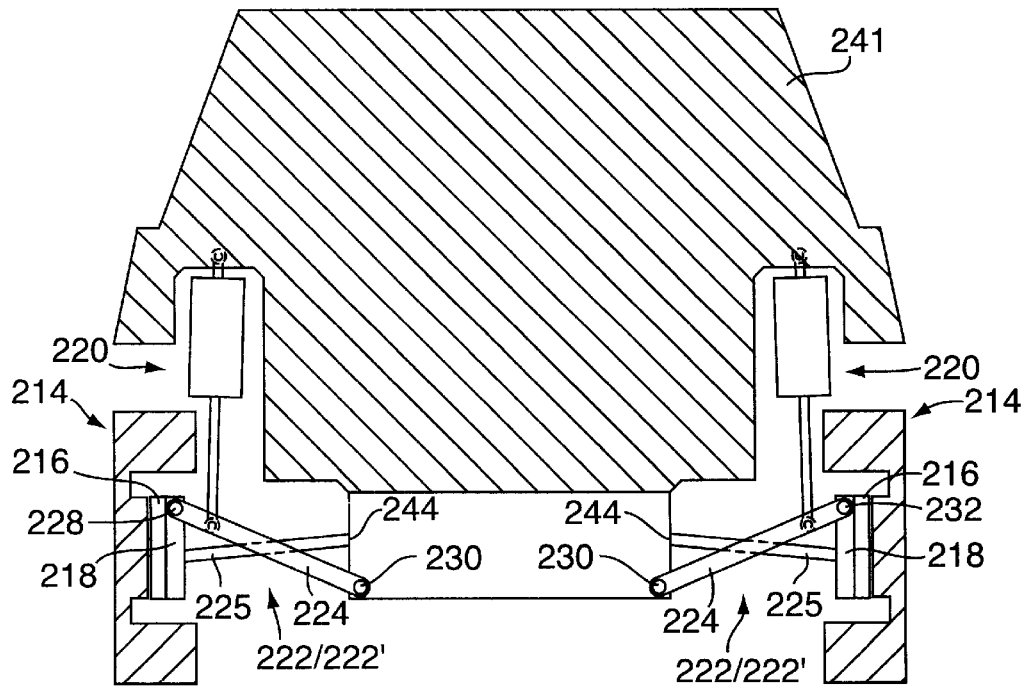

As shown in FIGS. 12a and 12b, the linking mechanisms, 22 and 222 respectively, are implemented on each of the four-wheel assemblies 214 of a vehicle 241. Vehicle 241 may be either a front wheel drive vehicle or a rear wheel drive vehicle wherein FIG. 12a illustrates those wheel assemblies 214 which are not actively driven in the front or rear wheel drive vehicle 241, and FIG. 12b illustrates those wheel assemblies 214 which utilize a drive shaft 225 and are actively driven in the front or rear wheel drive vehicle 241. In the suspension system integrated into the wheel assemblies 214 shown in FIG. 12b, the drive shaft 225 serves as one of the elongated members crossing elongated member 224 to form the crossed linking mechanisms, 222 or 222' respectively, illustrated in FIG. 10 or 11. Moreover, FIG. 12a illustrates those wheel assemblies 214 which do not utilize a drive shaft 225, but rather utilize the linking mechanisms, 22 or 122 respectively, affixed between each wheel assembly 214 and the vehicle frame 212 in arrangements as previously described in relation to FIGS. 1–3.

More specifically, FIG. 12b illustrates one end of the vehicle 241 including the linking mechanisms 222 or 222', shown in FIGS. 10 and 11, affixed between each wheel assembly 214 and the vehicle frame 212, wherein the drive shaft 225 provides structural support between the wheel assembly 214 and the vehicle body 212. It should be readily apparent that the drive shaft 225 does not interfere with the application of the linking mechanisms 222 or 222' during the operation of the suspension system 200 or 200'.

Figure 13:
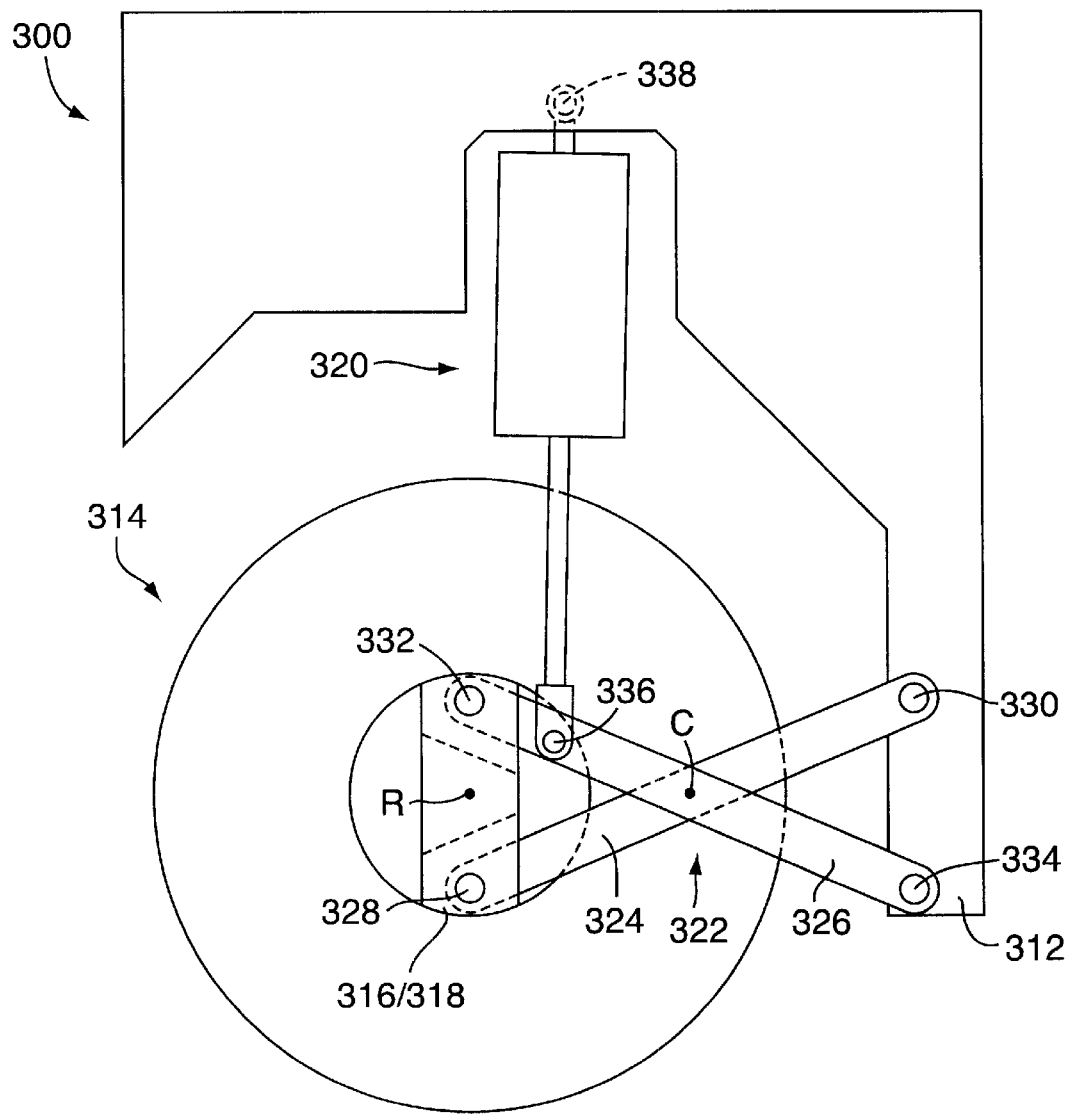
FIG. 13 is a partial cross-sectional view of a zero roll suspension system having parallel rotational and crossing axes, according to another embodiment of the present invention.

The embodiments of the present invention as illustrated in FIGS. 1–12b have shown various specific arrangements a zero roll suspension system, as well as disclosing how various specific designs of such a zero roll suspension system may be combined to accommodate differing vehicle types and desired ride characteristics. As is evident in the embodiments shown in FIGS. 1–12b, the linking mechanism between the wheel assembly and the vehicle frame have been shown for illustration purposes as having a crossing axis C which is oriented approximately perpendicular to the rotational axis R of the wheel assembly. In the alternative, FIG. 13 illustrates yet another embodiment of a zero roll suspension system, designated by the reference numeral 300, wherein the linking mechanism between the wheel assembly and the vehicle frame has a crossing axis C which is oriented approximately parallel to the rotational axis R of the wheel assembly 314. It will be readily apparent that the rotational axis R and the crossing axis C are not required to be at any predetermined angle to one another in order for the beneficial aspects of the present invention to be realized. That is, the rotational axis R and the crossing axis C need not necessarily be approximately parallel, but rather may be at any angle to one another, such as but not limited to approximately 0°, 45° or 90°, given a specific configuration of the connection points on the wheel assembly 314 and vehicle frame 312.

More specifically, the suspension system 300 is adapted to be received by the body of a vehicle, such as an automobile frame 312, having a wheel assembly 314, a spindle 316, a kingpin 318, and a spring and shock absorber assembly 320. The wheel assembly 314 has an axis of rotation R about which a wheel of the wheel assembly 314 rotates. The vehicle frame 312 may be of any automobile make or model, a pick-up truck, an utility truck, a three-wheeled, a four-wheeled or more wheeled vehicle that tends to rotate or roll, during cornering.

The spring and shock absorber assembly 320 provides vertical support for the wheel assembly 314 and the vehicle frame 312 while, as is commonly known, the wheel assembly 314, the spindle 316 and the kingpin 318 are each integrally connected in a conventional manner so as to provide for structural stability and control of the vehicle. While the suspension system 300 will function with most vehicles, it should be readily apparent that the actual size of various components will depend upon the size and weight of the associated vehicle. It should be readily apparent that while one linking mechanism 322 has been described, more than one linking mechanism may be alternatively substituted without departing from the broader aspects of the present invention, as will be described later.

Referring still to FIG. 13, the linking mechanism 322 of the present invention reverses the moment, preferably at the wheel, to oppose the rolling moment of the vehicle body 312 during cornering. The linking mechanism 322 includes at least a first elongated member 324 and a second elongated member 326 which are oriented so as to cross each other in parallel planes along a crossing axis C. Each elongated member, 324 and 326 respectively, are additionally oriented so as to cross the rotational axis R of the wheel assembly 314. The present invention, however, is not limited in this regard as the elongated members 324 and 326 may be oriented between the wheel assembly 314 and the vehicle frame 312 so that they cross one another at a location either above or below the rotational axis R as seen in FIG. 13. Moreover, in the embodiment of FIG. 13, the crossing axis C of the elongated members 324 and 326 is approximately parallel to the rotational axis R. It will be readily apparent that the rotational axis R and the crossing axis C are not required to be at any predetermined angle to one another in order for the beneficial aspects of the present invention to be realized. As noted above, the rotational axis R and the crossing axis C need not necessarily be approximately parallel, but rather they may be at any angle to one another given a specific configuration of the connection points on the wheel assembly 314 and vehicle frame 312.

The first and second elongated members 324 and 326 may be formed from a metal, a metal-alloy or the like, provided they remain substantially rigid. Preferably, the spring and shock absorber assembly 320 is attached to either the first elongated member 324 or the second elongated member 326 via rotatable pin joint 336, while also being anchored to the vehicle body 312 via rotatable pin joint 338. As is further illustrated in FIG. 13, the linking mechanism 322 is fixed to the kingpin 318 at connection points 332 and 328 in any conventional manner so as to enable the linking mechanism 322 to be freely rotatable about connection points 332 and 328 during operation of the suspension system 300. While connection between the shock absorber 320 and either of the elongated members, 324 and 326 respectively, has been described and shown in FIG. 13, the present invention is not limited in this regard as the shock absorber 320 may alternatively be rotatably fixed to either the spindle 316 or the kingpin 318 without departing from the broader aspects of the present invention.

The connection points on the vehicle body 330 and 334, respectively, may be located as shown at in FIG. 13 or at other points of the vehicle frame 312; however, it is preferable that the connection points 330 and 334 be fixed to the vehicle frame 312 at points on the vehicle frame 312 which are approximately horizontally co-planar to the connection points 332 and 328, respectively. In addition, it is preferable that the connection points 332 and 328 are to be rotatably fixed to either the spindle 316 or the kingpin 318 so as to be approximately vertically co-planar with one another, while it is preferable that the connection points 330 and 334 are to be rotatably fixed to the vehicle frame 312 so as to be approximately vertically co-planar with one another as well. Moreover, each of the connection points, 330, 334, 332 and 328 respectively, may be fixed to the wheel assembly 314, including either the spindle 316 or the kingpin 318, and to the vehicle frame 312 in any conventional manner, such as but not limited to a pin joint or a ball joint, provided that the linking mechanism 322 is freely rotatable about the connection points 330, 334, 332 and 328 during operation of the suspension system 300. It will be readily apparent that by changing the vertical distances between the connection points 332 and 328, as well as between the connection points 330 and 334, the roll reducing effect may be correspondingly increased or decreased.

The first elongated member 324 must be long enough to reach between a first connection point 328 which, as discussed previously, may be fixed to the kingpin 318 or the spindle 316, and a second connection point 330 on the vehicle body or frame 312 in a substantially passive manner, that is, such that the first elongated member 324 does not cause any active stressing on the vehicle body 312, the spindle 316, the kingpin 318 or the second elongated member 326. Similarly, the second elongated member 326 must be long enough to reach between a first connection point 332, which may be on the kingpin 318 or the spindle 316, and a second connection point 334, which may be on the vehicle body 312, in a largely passive manner, that is, such that the second elongated member 326 does not cause any active stressing on the vehicle body 312, the spindle 316, the kingpin 318 or the first elongated member 324. While the kingpin 318 or the spindle 316 has been described as the preferred anchoring location for the linking mechanism 322, the present invention is not limited in this regard as other, alternative anchoring locations may be substituted so long as the linking mechanism 322 are fixedly attached to a portion of the wheel assembly 314 which remains substantially stationary with respect to a turning motion of the wheel itself.

In operation, the suspension system 300 as illustrated in FIG. 13 acts to reverse the rolling load moment at the wheel of the vehicle and transfers this reversed rolling load moment to the vehicle frame 312. The rolling load moment is typically generated by the force at the portion of the wheel contacting a travel surface during operation of the vehicle, such as but not limited to a cornering, acceleration or braking of the vehicle, or the like.

Figure 14:
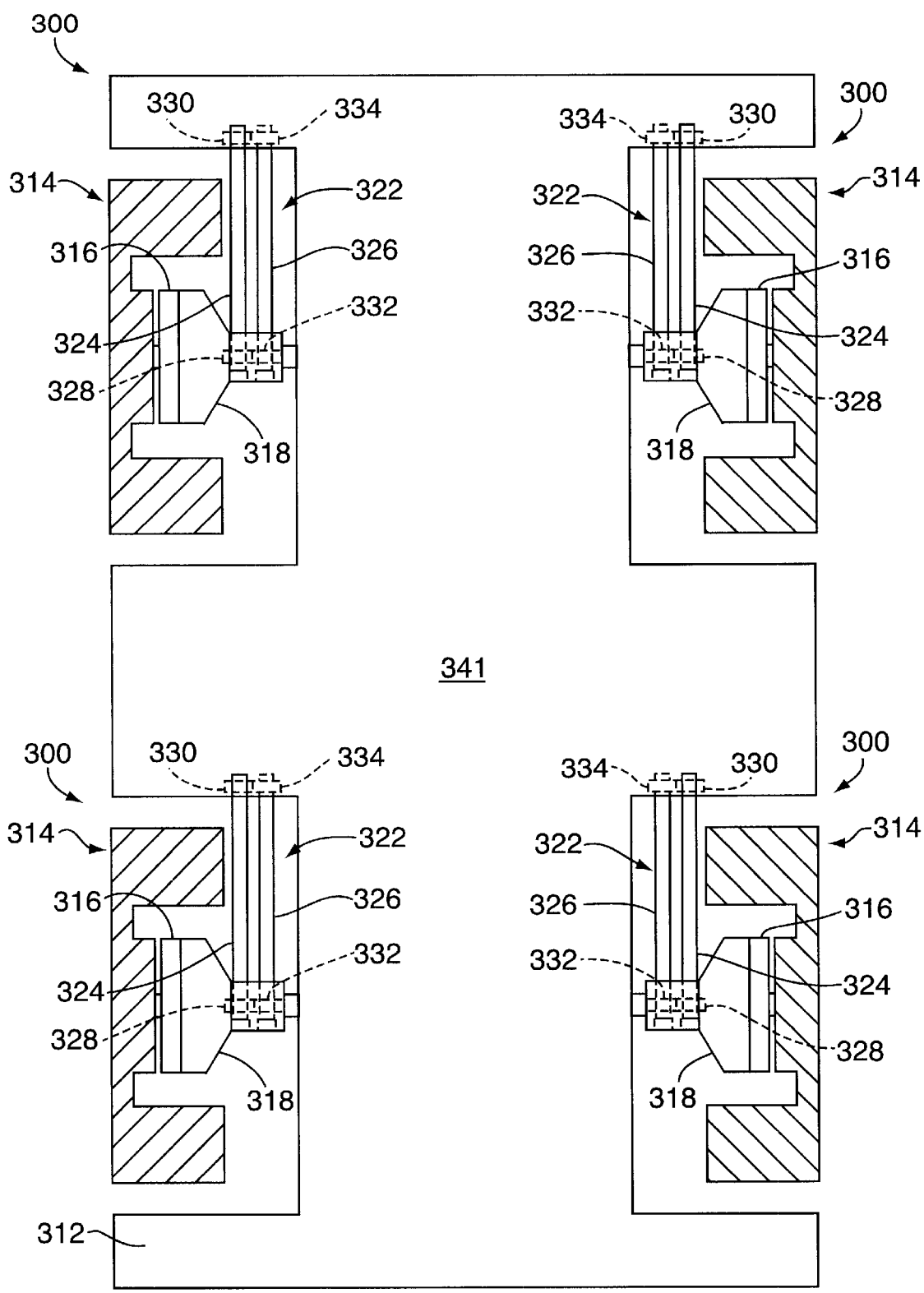
FIG. 14 is a top, partial cross-sectional plan view of a zero roll suspension system according to the embodiment depicted in FIG. 13.

FIG. 14 illustrates a partial cross-sectional plan view of the suspension system 300 of FIG. 13 being incorporated into a vehicle 341, such as but not limited to a front wheel drive vehicle, a rear wheel drive vehicle or a four wheel drive vehicle. FIG. 14 illustrates the linking mechanisms 322 affixed between each wheel assembly 314 and the vehicle frame 312 in a manner as discussed above in conjunction with FIG. 13. While only a single linking mechanism 322 is shown as being affixed between each wheel assembly 314 and the vehicle frame 312 in the cross-sectional plan view of FIG. 14, the present invention is not limited in this regard as pairs of linking mechanisms may be affixed at each wheel assembly 314 location, similar to the arrangement illustrated in FIGS. 2–3, without departing from the broader aspects of the present invention.

Figure 16:
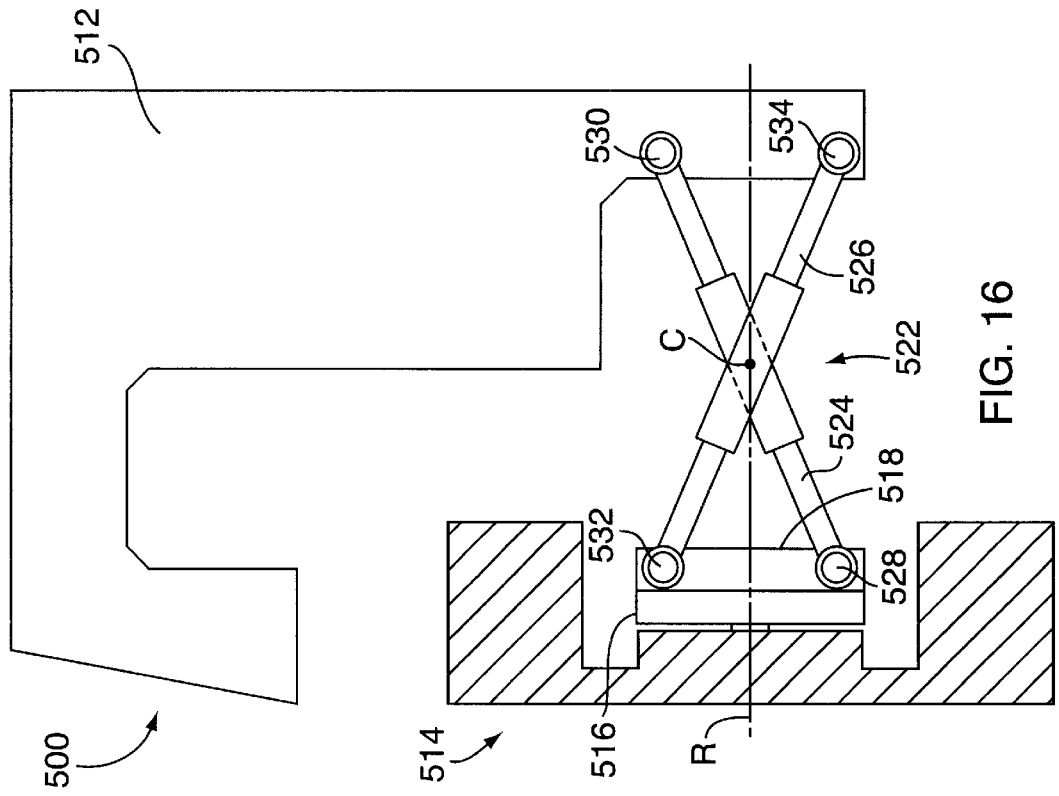
FIG. 16 is a partial cross-sectional view of a zero roll suspension system having variable length elongated members, according to another embodiment of the present invention.
Figure 15:
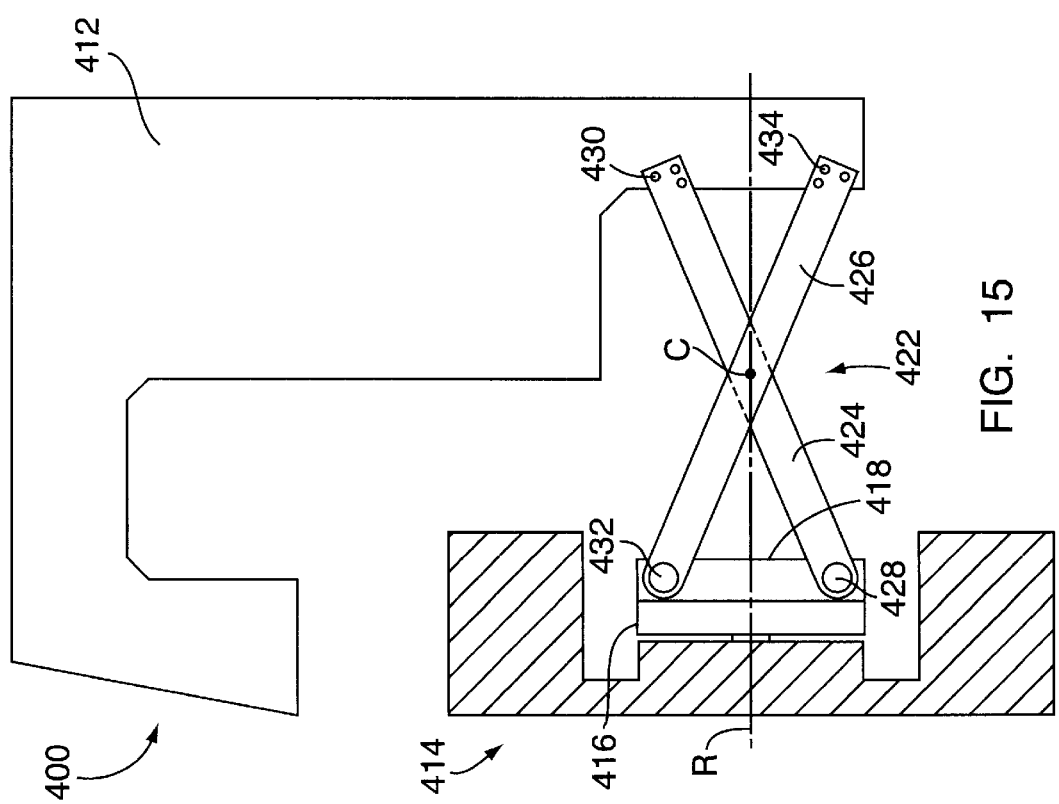
FIG. 15 is a partial cross-sectional view of a zero roll suspension system having flexible, multi-layered composite elongated members, according to another embodiment of the present invention.

As discussed above, FIGS. 1–14 of the present invention are concerned with a plurality of specifically oriented elongated members, preferably formed from any substantially rigid material including but not limited to metal, a metal-alloy, a composite material or the like. Moreover, as was also discussed, each of the elongated members need not be a single unitary element, but rather may be formed from a plurality of mated elements. FIGS. 15 and 16 illustrate two specific examples of alternative design embodiments of the elongated members capable of being utilized in each of the foregoing configurations as depicted in FIGS. 1–14.

FIG. 15 illustrates a zero roll suspension system 400 adapted to be received by the body of a vehicle, such as an automobile frame 412, having a wheel assembly 414, a spindle 416 and a kingpin 418. A crossed linking mechanism 422 acts to connect the wheel assembly 414 to the vehicle body 412. It should be readily apparent that while one linking mechanism 422 has been described, more than one linking mechanism may be alternatively substituted without departing from the broader aspects of the present invention, as has been described in conjunction with the embodiments of FIGS. 1–14.

Referring still to FIG. 15, the linking mechanism 422 of the present invention reverses the moment, preferably at the wheel, to oppose the rolling moment of the vehicle body 412 during cornering. The linking mechanism 422 includes a first elongated member 424 which crosses a second elongated member 426 and performs shock and springing functions in addition to the zero roll attributes discussed previously. The first and second elongated members of this type, 424 and 426 respectively, are preferably formed as flexible members, such as but not limited to multi-layered composite, elongated members having alternating layers of composite fibers and energy dampening elastomeric materials. While FIG. 15 depicts the matched connection points 432 and 428 as being rotatably fixed to the kingpin 418 and the matched connection points 430 and 434 as being non-rotatably fixed to the vehicle frame 412, the present invention is not limited in this regard. The matched connection points 430 and 434 may alternatively be rotatably fixed to the vehicle frame 412 so long as the matched connection points 432 and 428 are non-rotatably fixed to either the spindle 416 or the kingpin 418.

FIG. 16 illustrates a zero roll suspension system 500 according to another embodiment of the present invention. The zero roll suspension system 500 is adapted to be received by the body of a vehicle, such as an automobile frame 512, having a wheel assembly 514, a spindle 516, a kingpin 518 and a spring and shock assembly (not shown). A crossed linking mechanism 522 acts to connect the wheel assembly 514 to the vehicle body 512. It should be readily apparent that while one linking mechanism 522 has been described, more than one linking mechanism may be alternatively substituted without departing from the broader aspects of the present invention, as has been described in conjunction with the embodiments of FIGS. 1–14.

Referring still to FIG. 16, the linking mechanism 522 of the present invention reverses the moment, preferably at the wheel, to oppose the rolling moment of the vehicle body 512 during cornering. The linking mechanism 522 includes a first elongated member 524 which crosses a second elongated member 526 and performs the zero roll attributes discussed previously. The first and second elongated members of this type, 524 and 526 respectively, are preferably formed as variable length elongated members, such as but not limited to hydraulic or pneumatic cylinders. While FIG. 16 depicts both of the elongated members, 524 and 526 respectively, as being variable length members the present invention is not limited in this regard as only one of the elongated members, 524 and 526 respectively, may alternatively be a variable length member without departing from the broader aspects of the present invention. The connection points 532, 528, 530 and 534 of the elongated members 524 and 526 are configured to be rotatably fixed between the vehicle frame 512 and either the spindle 516 or the kingpin 518 in any conventional manner, such as but not limited to a pin joint or a ball joint, provided that the linking mechanism 522 is freely rotatable about the connection points 532, 528, 530 and 534 during operation of the suspension system 500.

The suspension system 500 advantageously optimizes tire camber, grip and other road handling characteristics of a vehicle when one or both of the elongated members 524 and 526 are selectively lengthened during cornering, braking or accelerating. This may be achieved by elongating one of the elongated members 524 and 526 when the unillustrated spring and shock assembly is compressed.

In view of the foregoing, the present invention contemplates a zero roll suspension system that reduces cornering roll, acceleration squat and braking dive to nearly zero through the use of crossed mechanical linkages that cancel the rolling moments at each wheel location.

Figure 17:
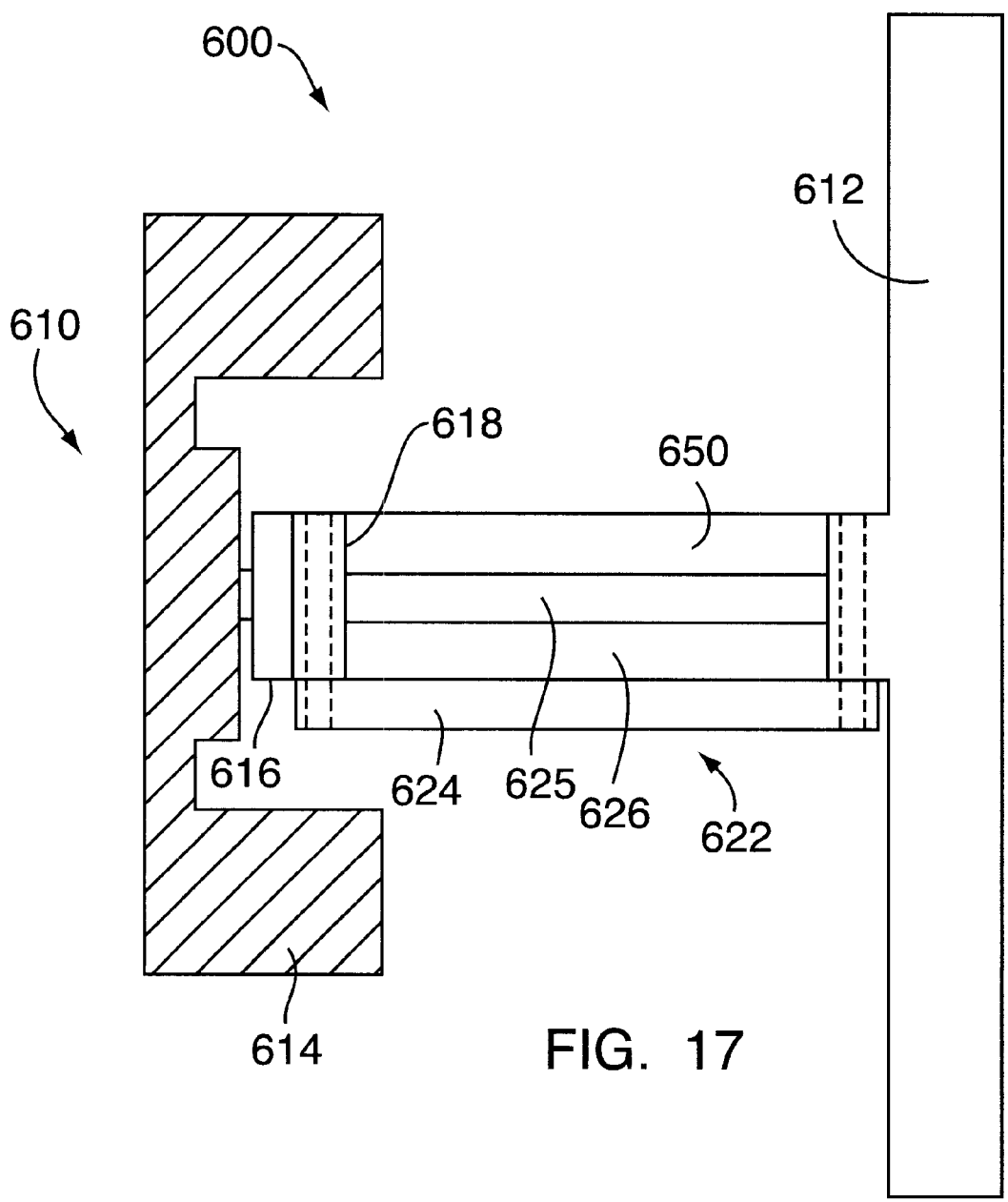
FIG. 17 is a top, partial cross-sectional plan view of a zero roll suspension system according to another embodiment of the present invention in which a toe bar is incorporated.

FIG. 17 illustrates a top, partial cross-sectional view yet another embodiment of a suspension system according to the present invention, generally designated by the reference numeral 600. The suspension system 600 is similar to the suspension systems illustrated in FIGS. 1–16; however the suspension system 600 additionally includes a toe control bar 650, which assists in maintaining the wheel assembly 614 in a proper, drive orientation. A linking mechanism 622 includes a pair of crossing members, 624 and 626 respectively, in close association with a drive shaft 625. The crossing members 624 and 626 are rotatably fixed between the vehicle frame 612 and either the spindle 616 or the kingpin 618 on the wheel assembly 614 so as to cross one another in superposition. The toe control bar 650 is likewise fixed between the vehicle frame 612 and either the spindle 616 or the kingpin 618 on the wheel assembly 614 in any conventional manner, such as but not limited to a ball joint, so as to allow for a wide range of movement of the toe control bar 650. The toe control bar 650 is preferably oriented so as to be aligned with either one of the crossing members, 624 and 626 respectively, thereby providing the greatest amount of control over the wheel assembly 614.

While the suspension system 600 as depicted in FIG. 17 has been described as including a crossed pair of crossing members, 624 and 626 respectively, which are rotatably fixed between the wheel assembly 614 and the vehicle frame 612, the present invention is not limited in this regard. The crossing members 624 and 626 may be alternatively fixed between the wheel assembly 614 and the vehicle frame 612 in a manner as described in conjunction with FIGS. 15 and 16, depending upon the particular structural nature of the crossing members 624 and 626. Moreover, the arrangement of the crossing members 624 and 626 with respect to the drive shaft 625 and the toe control bar 650 may also be altered from the position indicated in FIG. 17, provided that the crossing members 624 and 626 cross one another in superposition and the toe control bar 650, when viewed horizontally, is substantially aligned with one of crossing members 624 and 626. A pair of elongated members may alternatively be substituted for each of the crossing members 624 and 626, as has been discussed in conjunction with the previously disclosed embodiments of the present invention. The suspension system 600 of FIG. 17 is primarily concerned with the role and orientation of the toe control bar 650 and may be implemented in conjunction with the wheel assemblies of FIGS. 1–16 with or without the drive shaft 625.

It will be readily apparent to one of ordinary skill in the art that attributes of the embodiments as depicted in FIGS. 1–17 may be interchanged with one another without departing from the broader aspects of the present invention.

As discussed previously, a major aspect of the present invention is that the location of the connections points for the linking mechanism may be varied, provided that the elongated members of the linking mechanism remain crossed, so as to allow a desired amount of vehicle frame roll. Slight adjustments in the specific location of these connection points provide for the cambering by the wheels into a corner to thereby improve the cornering grip of a vehicle so equipped. Moreover, although the elongated members of the linking mechanism, including the various embodiments thereof, may cross one another in parallel planes as viewed horizontally, the present invention is not limited in this regard as the elongated members may have any planar relationship between one another provided that when viewed horizontally, the elongated members cross in superposition.

Another major aspect of the present invention is that the rotational axis of the wheel assembly and the crossing axis of the linking mechanism are not required to be at any predetermined angle to one another in order for the beneficial aspects of the present invention to be realized. That is, the rotational axis and the crossing axis need not necessarily be either approximately perpendicular or approximately parallel, but rather they may be at any angle to one another given a specific configuration of the connection points on the wheel assembly and vehicle frame.

FIG. 18 illustrates a partial cross-sectional perspective view of a suspension system 700, according to another embodiment of the present invention. The suspension system 700 is similar to the suspension systems illustrated in FIGS. 1–17; however the suspension system 700 additionally includes a compensation apparatus 702. As discussed previously, the roll reducing effect of the present invention may be correspondingly increased or decreased by changing the vertical distances between the connection points 732 and 728, as well as between the connection points 730 and 734. In certain circumstances, such as for riding comfort, vehicle design or the like, it may be beneficial to decrease the roll reducing effect of the present invention, thereby increasing the rolling of the vehicle body during operation. When the body roll of the vehicle is increased, the vehicle body tends to lift and so the compensation apparatus 702 is utilized to counteract this body lift.

As shown in FIG. 18, the compensation apparatus 702 is designed to provide a softer springing effect when the wheel assembly 714 is in 'bump', moving vertically up with respect to the vehicle body or chassis, as opposed to when the wheel assembly 714 is in 'rebound', moving vertically downward with respect to the chassis. The compensation apparatus 702 includes a central shaft 704 and first and second springs, 706 and 708 respectively. The first spring 706 is secured on one distal end to a first ledger 707, while being secured on the other distal end to a movable slider 710 whose downward movement is arrested by a fixed barrier 709. The central shaft 704 is integrally formed with, or fixed to, the first ledger 707 and is operatively connected, via a rotatable pin joint 736, to one of the two crossing arms, 724 and 726, of the linking mechanism 722. In this manner, the first ledger 707 will move with the support arm 704 as the wheel assembly 714 travels in bump or in rebound.

The second spring 708 is fixed on one distal end to the vehicle body 712, while being fixed on the other distal end to the movable slider 710. The movable slider 710 may include a center hub portion 711 and is normally biased by the second spring 708 to contact the fixed barrier 709. As depicted in FIG. 18, the central shaft 704 may be slidably nested within an internal bore formed in the center hub portion 711 for selective movement relative thereto. An alternative embodiment of the present invention contemplates adapting the center hub portion to extend to, and be rotatably anchored on, the body or chassis 712 via a rotatable pin joint or the like, without departing from the broader aspects of the present invention.

In operation, the compensation apparatus 702 is designed to counteract the lifting of the vehicle body by selectively employing one or both of the first and second springs, 706 and 708, as the wheel assembly 714 travels in bump or in rebound. As will be appreciated, when the wheel assembly 714 travels in bump past the equilibrium point which should be at the vehicle's ride height, the support arm 704 will correspondingly compress the first spring 706 and the second spring 708. Conversely, when the wheel assembly 714 has cause to travel in rebound past the equilibrium point of the two springs 706 and 708 which should be close to the vehicle's ride height, only the first spring 706 is employed as the first ledger 707 is drawn downward in association with the matching movement of the support arm 704. The second spring 708 is not utilized during in rebound travel owing to the restraining contact between the fixed barrier 709 and the second ledger 710, the nested end of the support arm 704 sliding part-way out of the internal bore formed in the center hub portion 711 during this operation.

The practical effect of the compensation apparatus 702 is to produce anti-lift of the vehicle body 712 during cornering and turning as there will be less resistance for an outside wheel assembly to move upwards, in bump, than for an inside wheel to move downward, in rebound. The net result of this system is that the vehicle body is moved downward, thereby compensating for any inherent body lift, regardless of the specific arrangement of the connection points 728, 730, 732 and 734 of the linking mechanism 722.

Another embodiment of a suspension system 800 which ensures that there will be less resistance to a wheel assembly moving upwards, in bump, than downwards, in rebound, is illustrated in the perspective partial cross-section of FIG. 19. The suspension system 800 is similar to the suspension systems illustrated in FIGS. 1–17, with the inclusion of a modified compensation apparatus 802.

As depicted in FIG. 19, the compensation apparatus 802 combines a known shock absorber 804 with a sliding springing apparatus 806, the compensation apparatus being rotatably connected between a fixed support arm 809 and one of the two crossing arms, 824 and 826, of the linking mechanism 822. The springing apparatus 806 includes a fixed lower support arm 808, a slidable upper support arm 840 and a compensation spring 810 disposed therebetween. As depicted on FIG. 19, the compensation apparatus 802 is orientated at approximately a 45–60° angle.

In operation, the compensation apparatus 802 is designed to counteract the lifting of the vehicle body 812 by selectively employing the springing force of the compensation spring 810, as the wheel assembly 814 travels in bump or in rebound. As will be appreciated, when the wheel assembly 814 travels in bump, the lower support arm 808 will exert an upwards force upon the compensation spring 810 which, in turn, will cause upper support arm 809 to slide upwards. In this manner, only the shock absorber 804 provides any significant resistance to the movement of the vehicle body 812, the compensation spring 810 not being substantially compressed as it moves with the wheel assembly 814 traveling in bump.

Conversely, when the wheel assembly 814 has cause to travel in rebound, the lower support arm 808 will exert an downwards force upon the compensation spring 810. As the upper support arm 809 is restrained from continued downward movement by the arresting action of the shock absorber 804, the springing force of the compensation spring 810 provides increasing resistance to the movement of the vehicle body 812, coupled with the resistance also provided by the shock absorber 804.

Similar to the compensation apparatus 702 described above, the practical effect of the compensation apparatus 802 is to produce anti-lift of the vehicle body 812, as there will be less resistance for an outside wheel assembly to move upwards, in bump, than for an inside wheel to move downward, in rebound. The net result of this system is that the vehicle body 812 is moved downward, thereby compensating for any increased roll and inherent body lift regardless of the particular arrangement of the connection points 828, 830, 832 and 834 of the linking mechanism 822. It will be readily apparent that the compensation apparatus 802 may be employed apart from the shock absorber 804 without departing from the broader aspects of the present invention.

With respect to the suspension systems 700 and 800 depicted in FIGS. 18 and 19, respectively, the present invention is not limited to the specific structural configuration of elements shown in FIGS. 18 and 19. Indeed, the present invention contemplates any suspension configuration in which the resistance to a wheel assembly moving down and away, in rebound, from the vehicle body is greater than the resistance to that wheel assembly moving upwards, in bump, thereby offsetting any vehicle rise or lift stemming from a particular orientation of the linking mechanisms, 722 and 822, or the like. Moreover, the present invention may employ alternative springing devices and configurations, including digressive rate springs, without departing from the broader aspects of the present invention.

Figure 20:
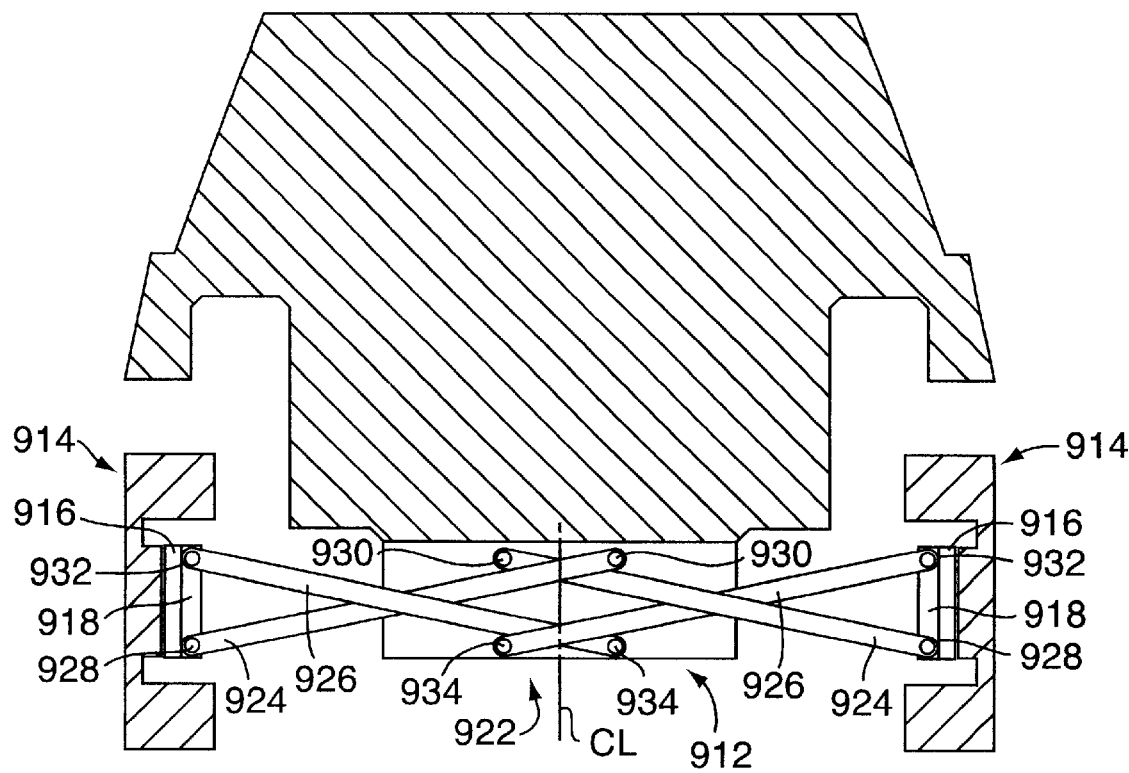
FIG. 20 illustrates a partial cross-sectional perspective view of a suspension system, according to yet another embodiment of the present invention.

As described above in conjunction with FIGS. 1–19, an important aspect of the suspension system of the present invention is to produce a roll center of a vehicle which is close to, but below, the geometric center of gravity of the vehicle. Moreover, the present invention seeks to maintain this center of gravity at approximately the same position relative to the center of gravity during movement of the suspension system and vehicle operation. Towards this end, it has been discovered that if the crossing arms of each linking mechanism were elongated to cross the centerline of the vehicle, a more stable roll center may be formed. FIG. 20 illustrates a suspensions system 900 according to another embodiment of the present invention, which includes linking mechanisms having such elongated crossing arms.

As shown in FIG. 20, each of the linking mechanisms 922 include a pair of crossing arms, 924 and 926 respectively, which are rotatably fixed to the vehicle body 912 and which also cross the center line CL of the vehicle body 912. As will be appreciated, the arrangement of the crossing arms 924 and 926 as depicted in FIG. 20 will produce an effective roll center for the vehicle which is aligned with, yet below, the vehicle's geometric roll center.

While the crossing arms 924 and 926 of the linking mechanisms 922 are shown as being rotatably connected between the vehicle body 912 and the spindle 918, the present invention is not limited in this regard as the connection points 932 and 928 of the crossing arms 924 and 926 may be alternatively configured to be rotatably fixed between the vehicle frame 912 and the kingpin 918 without departing from the broader aspects of the present invention.

Figure 20A:
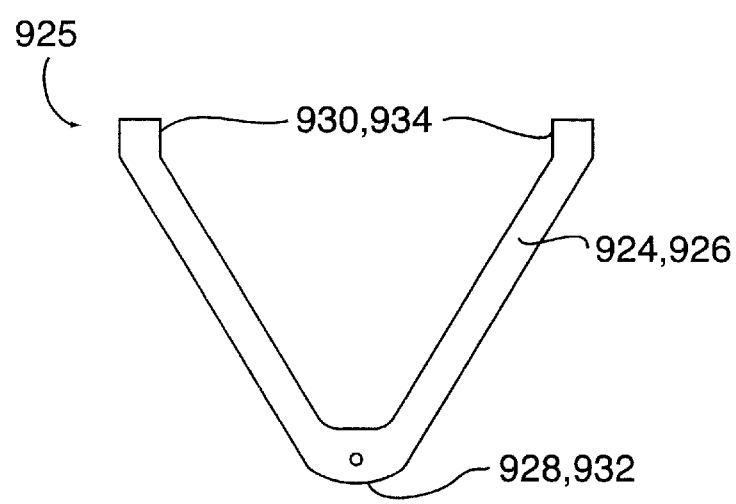
FIG. 20A schematically illustrates an A-frame for use as a crossing arm, in accordance with one embodiment of the present invention.

It is an important aspect of the present invention that the crossing arms of the present invention may be formed from a plurality of mated elements, as discussed previously. Moreover, a preferred embodiment of the present invention includes forming each crossing arm as an A-frame, wherein the two A-frames, or crossing arms, are rotatably disposed between the vehicle chassis and the wheel assembly. FIG. 20A schematically illustrates a A-frame 925 for use with the suspension systems of the present invention. As will be appreciated, when utilizing the A-frame 925 in association with, for example, the suspension system of FIG. 20, either crossing arm, 926 or 924, may be formed as the A-frame 925 and will includes an apex connection point, 928 or 932, rotatably connected to the wheel assembly 914, while the two distal ends, either 930 or 934, of the A-frame 925 will be rotatably connected to the vehicle body 912. With such an architecture, the two connection points of each A-frame would be rotatably connected to the vehicle chassis, one vertically disposed above the other, while the apex connection point for each A-frame is correspondingly rotatably connected to the wheel assembly. A schematic representational view of such a configuration is depicted in FIG. 21A.

FIG. 21A shows a parallel configuration of the linking mechanism of the present invention, as defined by a first plane 958 passing through the centerlines of the upper connection points on the vehicle chassis, 950/952, and a second plane 968 passing through the centerlines of the lower connection points on the vehicle chassis, 960/962. The apex connection points for each of the first and second A-frame crossing arms are rotatably connected to an unillustrated wheel assembly so that the first and second A-frames cross each other in superposition. It has been discovered, however, that greater anti-dive and anti-squat protection may be conferred by the suspension system of the present invention if the planes, 958 and 968, are not parallel with one another.

FIG. 21B depicts such a preferred orientation of the connection points 952/954 and 960/962, which assist in increasing the anti-dive and anti-squat attributes of the present invention. As depicted in FIG. 21B, the upper connection points, 950/952, are arranged so that a plane 958' passing through their centerlines is not parallel to a plane 968' passing through the centerlines of the lower two connection points, 960/968. As will be appreciated, the planes 958' and 968' represent horizontal planes, seen on edge in FIGS. 21A and 21B, when the suspension system of the present invention is viewed from the side of the vehicle. It will also be readily appreciated that FIGS. 21A and 21B are representational in their depiction of the present invention, wherein the dimensions between the connection points are exaggerated for clarity, and may be modified as necessary to ensure that the A-frames cross one another in superposition.

As discussed previously, one aspect of the present invention is to reduce or eliminate body lift of a vehicle during operation thereof. Conventional vehicles typically orient one, or both, of the wheel sets of a vehicle to have a toe-in condition. This toe-in condition, however, has the undesirable effect of inducing body lift in a vehicle equipped with a suspension system of the present invention. Another manner in which a vehicle may be subject to additional and undesirable body lift is if the vehicle has insufficient Ackerman, which is defined as an effect wherein the inside wheel assembly, during cornering, is at a greater angle away from the longitudinal centerline of the vehicle body than is the outside wheel assembly. Conversely, more Ackerman creates a toe-out condition and induces a lowering of the vehicle body during cornering. The present invention, therefore, seeks to compensate for any body lift during cornering caused by the inclusion of the suspension system of the present invention, or caused by a toe-in condition due to insufficient Ackerman or the like, by increasing the amount of Ackerman for the vehicle.

FIG. 22 illustrates a top perspective view of an unillustrated vehicle, including first and second wheel sets, 1000 and 1002 respectively, the vehicle having a longitudinal axis X. The second wheel set 1002 defines a rotational axis 1004, which intersects the axis X at a point 1005. A steering attachment point 1006 and a suspension system attachment point 1008 are schematically depicted in the first wheel set 1000. An Ackerman quotient concerns the turning radius of each wheel during a cornering operation and may be approximated by tracing a line through both the steering attachment point 1006 and the suspension attachment point 1008, such as a king pin axis. When the resultant trace line 1010 also bisects the intersection point 1005, 100% Ackerman is said to have been achieved. The further that the intersection of the line 1010 with the rotational axis 1004 travels in either direction from the intersection point 1005, the greater the reduction in the Ackerman quotient.

A typical Ackerman quotient is approximately 50%. The present invention seeks to orient the connection points for the suspension system of FIGS. 1–21B, that is, suspension point 1008, in such a manner to increase the Ackerman quotient to approximately 70%, tending towards 100% as the steering angle of the vehicle increases. By controlling the position of the suspension connection point 1008, the present invention alters the Ackerman quotient to reduce or eliminate the body lift of the vehicle caused by lateral cornering forces.

Similarly, while the method described in conjunction with FIG. 22 for increasing Ackerman, in an effort to reduce body lift in the front of a vehicle, has been described, rear toe control is also important to reduce body lift. When wheel assemblies travel in-bump, the wheel assemblies experience a slight toe-in condition, while when moving in-rebound, the wheel assemblies experience a slight toe-out condition. In situations where the vehicle experiences a cornering action, that is, when only one wheel assembly moves in bump and one moves in rebound, it is desirous to provide a toe-out condition to both wheel assemblies, thereby limiting body lift. Indeed, one object of the present invention is to ensure that the rear wheel assemblies of a vehicle experience toe-out during cornering or the like. Moreover, another aspect of the present invention is to achieve approximately a zero toe change for a pair of wheel assemblies during those times when both wheel assemblies in a wheel set experience simultaneous in-bump or in-rebound travel.

Figure 23:
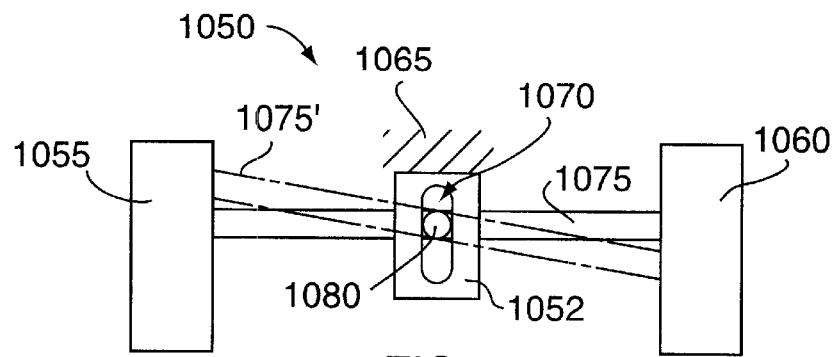
FIG. 23 illustrates a perspective end view of a vehicle equipped with a suspension system according to another embodiment of the present invention.

A toe apparatus 1050 is depicted in FIG. 23 and includes a sliding base 1052 disposed between first and second, non-steered, wheel assemblies 1055 and 1060 respectively. As shown in the perspective end view of FIG. 23, the sliding base 1052 is fixed to the frame 1065 of the vehicle and includes a slotted opening 1070. A toe control bar 1075 extends between the wheel assemblies 1055 and 1060 and is fixed to, or integral with, an alignment hub 1080 which is configured for sliding movement within the slotted opening 1070. The toe control bar 1075 is rotatably connected to the hub section of the wheel assemblies 1055 and 1060. Moreover, it is an important aspect of the present invention that the toe control bar 1075 is rotatably attached to a rear portion of the hub section of the wheel assemblies 1055 and 1060, thereby ensuring that the wheel assemblies 1055 and 1060 will display a toe-out orientation during cornering. The present invention also contemplates alternatively angling the toe control bar 1075' with respect to the vehicle frame (shown in exaggerated, dashed line form in FIG. 23) so that the horizontal distance between the two wheel assemblies 1055 and 1060 is reduced, further amplifying the toe-out positioning of the toe control bar 1075'.

As will be readily appreciated, by fixing the toe control bar 1075 to a rear portion of the wheel assemblies 1055 and 1060, the present invention not only accomplishes a toe-out condition during cornering, but also achieves an approximately zero toe change for the wheel assemblies 1055 and 1060 during those times when both wheel assemblies 1055 and 1060 experience simultaneous in-bump or in-rebound travel. It should be readily appreciated that the toe apparatus 1050 depicted in FIG. 23 may be utilized with or without incorporating the suspension system of FIGS. 1–22 without departing from the broader aspects of the present invention.

Moreover, although the toe apparatus 1050 has been described as being employed with non-steered wheel assemblies, the present invention is not so limited in this regard. For example, the toe apparatus 1050 may also be employed in conjunction with steerable wheel assemblies by adapting the sliding base 1052 to shift in accordance with the movement of the steering mechanism.

Figure 24A:
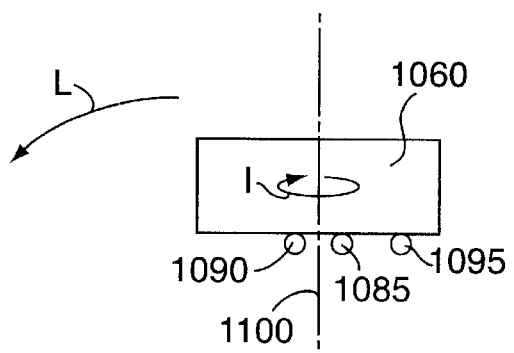
FIG. 24A illustrates a top view of a wheel assembly having compliant bushings, according to another embodiment of the present invention.
Figure 24B:
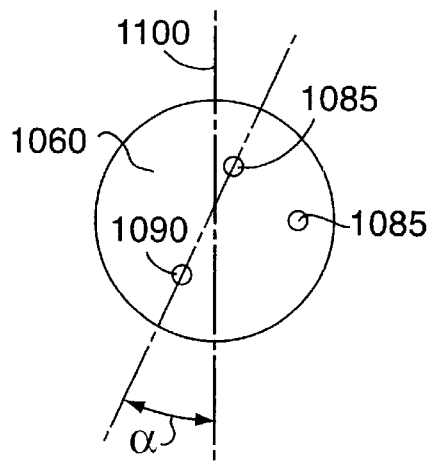
FIG. 24B illustrates a side view of the wheel assembly shown in FIG. 24A.

While the toe apparatus 1050 shown in FIG. 23 assists in maintaining a toe-out condition during cornering, the present invention is not limited in this regard as alterations may be made to the toe apparatus 1050 to further enhance a toe-out condition, without departing from the broader aspects of the present invention. FIGS. 24A and 24B depict a top perspective view and an inner side perspective view, respectively, of the wheel assembly 1060 in which a particular arrangement of variable-nature bushings are utilized to further enhance a toe-out condition during cornering.

It will be readily appreciated that as the vehicle performs a cornering operation, the outside wheel experiences more force than does the inside wheel. Moreover, if the castor angle is greater than zero degrees, the force from the road acting upon the wheel will create a torque about the line joining the connection points of the suspension system of the present invention. With specific reference to FIGS. 24A and 24B, as the outer wheel assembly 1060 turns and moves in a direction L, a torque T is imparted due to the castor angle α and the turning motion of the wheel assembly 1060. The upper and lower connection points, 1085 and 1090 respectively, correspond to the attachment points of the suspension system of the present invention, as shown in FIGS. 1–22, while the attachment point 1095 corresponds to the positioning of the toe control bar 1075 depicted in FIG. 23.

It is therefore one aspect of the present invention to utilize more compliant bushings for the connection point 1095 of the toe control bar 1075, than is utilized for the upper and lower connection points, 1085 and 1090 respectively. The torque T will cause a toe-out on the outer wheel assembly 1060, and a toe-in on the inner wheel assembly, in proportion to the force being applied from the road surface to the respective wheel assemblies. Since the outer wheel assembly 1060 experiences more force than does the inner wheel assembly, the toe-out affecting the outer wheel assembly 1060 will have a greater angle from a longitudinal centerline 1100 than will the angle of the toe-in affecting the inside wheel assembly. Given this architecture, the use of a more compliant bushing at the connection point 1095 permits greater toe-out for the outer wheel assembly 1060, thereby producing greater anti-lift on the vehicle as a whole.

Although the present invention has been illustrated and described with reference to preferred embodiments, it will be appreciated by those of ordinary skill in the art, that various modifications to this invention may be made without departing from the spirit and scope of the invention.

What is claimed is:

1. A suspension system for a vehicle including a vehicle frame and a wheel assembly having an axis of rotation about which a wheel of said wheel assembly rotates, said suspension system comprising:

a first crossing member;

a second crossing member;

said first and second crossing members each having a first end and a second end;

one of said first and second ends of each of said first and second crossing members is mated to said wheel assembly and the other of said first and second ends of each of said first and second crossing members is mated to said vehicle frame, said first and second crossing members oriented so as to cross one another in superposition; and wherein said first crossing member comprises a first A-frame and said second crossing member comprises a second A-frame.

2. The suspension system according to claim 1, wherein:

said first crossing member extends from said wheel assembly and across a longitudinal centerline of said vehicle whereby said first and said second ends of said first crossing member are disposed on opposing sides of said longitudinal centerline; and said second crossing member extends from said wheel assembly and across a longitudinal centerline of said vehicle whereby said first and said second ends of said second crossing member are disposed on opposing sides of said longitudinal centerline.

3. The suspension system according to claim 2, wherein:

said first and said second crossing members are pivotably mated to a portion of said vehicle frame which lies below a center of gravity of said vehicle.

4. The suspension system according to claim 1, wherein:

said first and said second A-frames each include two linking arms having distal ends, said linking arms meeting at a common apex point.

5. The suspension system according to claim 4, wherein:

said common apex point of said first and said second A-frames are pivotably mated to said wheel assembly; and said distal ends of said first and said second A-frames are pivotably mated to said vehicle frame.

6. The suspension system according to claim 1, further comprising:

a compensation apparatus connected between said vehicle frame and one of said first and said second crossing members, said compensation apparatus including a first elastic element and a second elastic element.

7. The suspension system according to claim 6 wherein:

said first elastic element is comprised of a first spring; and said second elastic element is comprised of a second spring.

8. The suspension system according to claim 6, wherein:

said first elastic element and said second elastic element dynamically act on said wheel assembly when said wheel assembly moves substantially towards said vehicle frame; and said first elastic element dynamically acts on said wheel assembly when said wheel assembly moves substantially away from said vehicle frame.

9. The suspension system according to claim 8, wherein:
one of said first elastic element and said second elastic element includes a shock absorber.

10. A method for suspending a vehicle having a vehicle frame, said method comprising the steps of:
providing a first crossing member to extend from a first wheel assembly to said vehicle frame;
providing a second crossing member to extend from said first wheel assembly to said vehicle frame, said first and said second crossing members being oriented so as to cross one another in superposition;
pivotably attaching a first end of said first crossing member to said vehicle frame;
pivotably attaching a second end of said first crossing member to said first wheel assembly, whereby said first and said second ends of said first crossing member are disposed on opposing sides of a longitudinal centerline of said vehicle;
pivotably attaching a first end of said second crossing member to said vehicle frame; and
pivotably attaching a second end of said second crossing member to said first wheel assembly, whereby said first and said second ends of said second crossing member are disposed on opposing sides of said longitudinal centerline.

11. The method for suspending a vehicle having a vehicle frame according to claim 10, said method further comprising the steps of:
pivotably attaching said first ends of said first and said second crossing members to a portion of said vehicle frame which is below a center of gravity of said vehicle.

12. The method for suspending a vehicle having a vehicle frame according to claim 10, said method further comprising the steps of:
forming said first crossing member as an A-frame; and
forming said second crossing member as an A-frame.

13. A method for suspending a vehicle having a vehicle frame, said method comprising the steps of:
providing a first crossing member to extend from a wheel assembly to said vehicle frame;
providing a second crossing member to extend from said wheel assembly to said vehicle frame, said first and said second crossing members being oriented so as to cross one another in superposition;
pivotably attaching a compensation apparatus between said vehicle frame and one of said first and said second crossing members, said compensation apparatus including a first elastic element and a second elastic element;
arranging said first elastic element and said second elastic element to ensure that said first elastic element and said second elastic element dynamically act on said wheel assembly when said wheel assembly moves substantially towards said vehicle frame; and
arranging said first elastic element to ensure that only said first elastic element dynamically acts on said wheel assembly when said wheel assembly moves substantially away from said vehicle frame.

14. A suspension system for a vehicle including a vehicle frame and a wheel assembly having an axis of rotation about which a wheel of said wheel assembly rotates, said suspension system comprising:
a first crossing member;
a second crossing member;
said first and second crossing members each having a first end and a second end;
one of said first and second ends of each of said first and second crossing members is mated to said wheel assembly and the other of said first and second ends of each of said first and second crossing members is mated to said vehicle frame, said first and second crossing members oriented so as to cross one another in superposition; said first crossing member extends from said wheel assembly and across a longitudinal centerline of said vehicle whereby said first and said second ends of said first crossing member are disposed on opposing sides of said longitudinal centerline; and
said second crossing member extends from said wheel assembly and across a longitudinal centerline of said vehicle whereby said first and said second ends of said second crossing member are disposed on opposing sides of said longitudinal centerline.

* * * * *

UNITED STATES PATENT AND TRADEMARK OFFICE
CERTIFICATE OF CORRECTION

PATENT NO. : 6,550,797 B2
DATED : April 22, 2003
INVENTOR(S) : J. Todd Wagner

It is certified that error appears in the above-identified patent and that said Letters Patent is hereby corrected as shown below:

<u>Title page,</u>
Item [60], Related U.S. Application Data, after "Nov.", please delete "22" insert -- 11 --.

Signed and Sealed this

Second Day of December, 2003

JAMES E. ROGAN
*Director of the United States Patent and Trademark Office*